(12) United States Patent
Sugawara

(10) Patent No.: US 12,301,997 B2
(45) Date of Patent: May 13, 2025

(54) OPTICAL-ELEMENT DRIVING DEVICE, CAMERA MODULE AND CAMERA-MOUNTED DEVICE

(71) Applicant: MITSUMI ELECTRIC CO., LTD., Tokyo (JP)

(72) Inventor: Masayoshi Sugawara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 168 days.

(21) Appl. No.: 17/907,410

(22) PCT Filed: Mar. 30, 2021

(86) PCT No.: PCT/JP2021/013592
§ 371 (c)(1),
(2) Date: Sep. 27, 2022

(87) PCT Pub. No.: WO2021/200980
PCT Pub. Date: Oct. 7, 2021

(65) Prior Publication Data
US 2023/0224585 A1 Jul. 13, 2023

Related U.S. Application Data

(60) Provisional application No. 63/078,357, filed on Sep. 15, 2020, provisional application No. 63/051,917, (Continued)

(51) Int. Cl.
*H04N 23/52* (2023.01)
*H04N 23/55* (2023.01)
(Continued)

(52) U.S. Cl.
CPC .......... *H04N 23/687* (2023.01); *H04N 23/52* (2023.01); *H04N 23/55* (2023.01); *H04N 23/57* (2023.01)

(58) Field of Classification Search
USPC .................. 396/55; 348/208.99; 358/208.99
See application file for complete search history.

(56) References Cited

U.S. PATENT DOCUMENTS

| | | | | |
|---|---|---|---|---|
| 7,778,536 | B2 * | 8/2010 | Okamura | ............... H04N 23/68 348/208.7 |
| 7,817,908 | B2 * | 10/2010 | Kawai | ..................... G03B 5/00 348/208.11 |

(Continued)

FOREIGN PATENT DOCUMENTS

| | | | |
|---|---|---|---|
| CN | 110456474 A | * | 11/2019 |
| JP | 08-029656 A | | 2/1996 |

(Continued)

OTHER PUBLICATIONS

International Search Report from International Application No. PCT/JP2021/013592 mailed Jun. 29, 2021.

*Primary Examiner* — Clayton E. LaBalle
*Assistant Examiner* — Warren K Fenwick
(74) *Attorney, Agent, or Firm* — Shih IP Law Group, PLLC.

(57) ABSTRACT

An optical-element driving device includes: a holding groove formed in a first fixing part to hold a first supporting part; and a first biasing part including an elastic member and a spacer that are disposed with the first supporting part in the holding groove. The first biasing part biases the first supporting part toward a first movable part by the elastic member via the spacer. The first supporting part includes a pair of ball rows arranged at an interval from each other outside of the first movable part. Each ball row is parallel to an optical axis. The ball rows being held respectively by different ones of a plurality of the holding grooves. The first biasing part biases one of the ball rows obliquely with (Continued)

respect to a formation direction in which one of the holding grooves for holding another one of the ball rows is formed.

19 Claims, 30 Drawing Sheets

Related U.S. Application Data filed on Jul. 15, 2020, provisional application No. 63/002,305, filed on Mar. 30, 2020.

(51) Int. Cl.
*H04N 23/68* (2023.01)
*H04N 23/57* (2023.01)

(56) References Cited

U.S. PATENT DOCUMENTS

| | | | | |
|---|---|---|---|---|
| 8,164,637 B2* | 4/2012 | Kawai | ................... | H02N 2/004 |
| | | | | 348/208.99 |
| 11,536,985 B2* | 12/2022 | Kasahara | ............... | G02B 7/003 |
| 11,640,072 B2* | 5/2023 | Kasahara | ............... | G02B 7/023 |
| | | | | 359/557 |
| 11,665,417 B2* | 5/2023 | Hsu | ...................... | G02B 13/001 |
| | | | | 348/345 |
| 2007/0164635 A1 | 7/2007 | Witteveen | | |
| 2016/0299349 A1* | 10/2016 | Cho | ......................... | G03B 5/02 |
| 2017/0052386 A1 | 2/2017 | Siegrist | | |
| 2017/0139225 A1* | 5/2017 | Lim | ..................... | H04N 23/687 |
| 2018/0356609 A1* | 12/2018 | Kim | ...................... | G03B 13/34 |
| 2020/0050084 A1* | 2/2020 | Lim | ......................... | G02B 7/04 |
| 2021/0173175 A1* | 6/2021 | Itagaki | .................... | G02B 7/09 |
| 2022/0308303 A1* | 9/2022 | Suzuki | ................... | G02B 7/005 |
| 2023/0016060 A1* | 1/2023 | Sugawara | ............... | G03B 3/02 |

FOREIGN PATENT DOCUMENTS

| | | |
|---|---|---|
| JP | 2008-503995 A | 2/2008 |
| JP | 3154894 U | 10/2009 |
| JP | 2013-210550 A | 10/2013 |
| JP | 2019-002972 A | 1/2019 |
| WO | 2015123787 A1 | 8/2015 |
| WO | 2020036157 A1 | 2/2020 |
| WO | 2021200980 A1 | 10/2021 |

* cited by examiner

OPTICAL-ELEMENT DRIVING DEVICE, CAMERA MODULE AND CAMERA-MOUNTED DEVICE

TECHNICAL FIELD

The present invention relates to an optical-element driving device, a camera module, and a camera-mounted device.

BACKGROUND ART

In general, a small-sized camera module is mounted in mobile terminals, such as smartphones. An optical-element driving device having an autofocus function of automatically performing focusing during capturing of a subject (hereinafter referred to as "Auto Focus (AF) function") and a shake-correcting function (hereinafter referred to as "Optical Image Stabilization (OIS) function") for reducing irregularities of an image by correcting shake (vibration) caused during capturing of an image is applied in such a camera module (see e.g., Patent Literature (hereinafter referred to as "PTL") 1).

The optical-element driving device having the AF and OIS functions is provided with an autofocus driving unit for moving a lens part in the optical-axis direction (hereinafter, the autofocus driving unit is referred to as "AF driving unit") and a shake-correcting driving unit for swaying the lens part in a plane orthogonal to the optical-axis direction (hereinafter, the shake-correcting driving unit is referred to as "OIS driving unit"). In PTL 1, a voice coil motor (VCM) is employed in the AF driving unit and the OIS driving unit.

In recent years, a camera module including a plurality of optical-element driving devices (typically, two optical-element driving devices) has been put into practical use (so-called dual camera). The dual cameras offer various possibilities according to situations where each of the dual cameras is used, such as a possibility that two images at different focal lengths can be captured at the same time, a possibility that a still image and a video image can be captured simultaneously, and the like.

CITATION LIST

Patent Literature

PTL 1
  Japanese Patent Application Laid-Open No. 2013-210550
PTL 2
  WO2015/123787

SUMMARY OF INVENTION

Technical Problem

However, the optical-element driving device utilizing the VCM as in PTL 1 is affected by external magnetism. Thus, there is a possibility that high-precision operation is impaired. In particular, in a dual camera in which optical-element driving devices are placed side by side, it is highly likely that magnetic interference occurs between the optical-element driving devices.

Meanwhile, PTL 2 discloses an optical-element driving device in which an ultrasonic motor is applied to an AF driving unit and an OIS driving unit. The optical-element driving device disclosed in PTL 2 is a magnetless device, and is thus capable of reducing the influence of external magnetism. However, its structure is complicated, and it is difficult to reduce the size and height.

An object of the present invention is to provide an optical-element driving device, a camera module, and a camera-mounted device capable of achieving a reduction in size and height and improving driving performance.

Solution to Problem

An optical-element driving device according to the present invention includes:
  a first fixing part;
  a first movable part disposed radially inside of the first fixing part;
  a first supporting part interposed between the first fixing part and the first movable part, and supporting the first movable part with respect to the first fixing part;
  a Z-direction driving part including an ultrasonic motor for converting a vibration into a linear motion, the Z-direction driving part being configured to move the first movable part in an optical-axis direction by the linear motion; and
  a first biasing part disposed on the first fixing part and configured to bias the first supporting part toward the first movable part, in which
  the first biasing part includes an elastic member that biases the supporting part, and a spacer disposed between the elastic member and the supporting part.

A camera module according to the present invention includes:
  the above-described optical-element driving device;
  an optical element to be attached to the movable part; and
  an image capturing part configured to capture a subject image imaged by the optical element.

A camera-mounted device according to the present invention is
  a camera-mounted device that is an information apparatus or a transporting apparatus, the camera-mounted device including:
  the above-described camera module; and
  an image processing part configured to process image information obtained by the camera module.

Advantageous Effects of Invention

According to the present invention, it is possible to reduce the size and height of the optical-element driving device, the camera module, and the camera-mounted device, and to improve the driving performance.

DESCRIPTION OF EMBODIMENTS

Hereinafter, embodiments of the present invention will be described in detail with reference to the drawings.

Figure 1A:
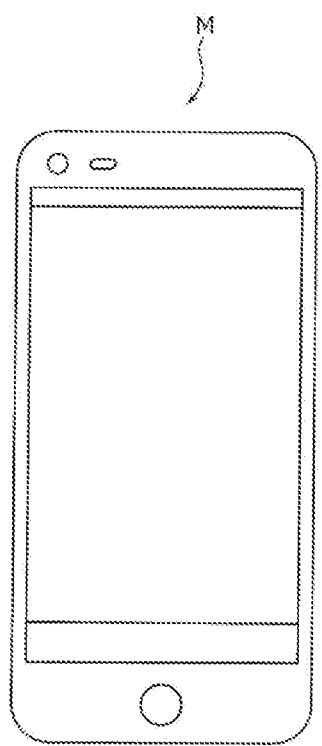
FIGS. 1A and 1B illustrate a smartphone in which a camera module according to one embodiment of the present invention is mounted.
Figure 1B:
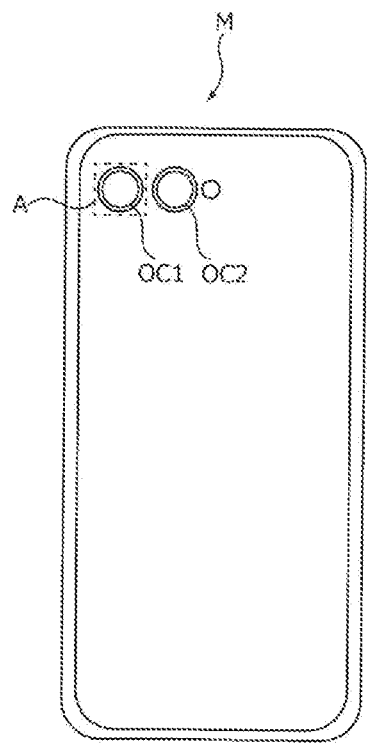

FIGS. 1A and 1B illustrate smartphone M (one example of a camera-mounted device) in which camera module A according to one embodiment of the present invention is mounted. FIG. 1A is a front view of smartphone M and FIG. 1B is a rear view of smartphone M.

Smartphone M includes a dual camera consisting of two back side cameras OC1 and OC2. In the present embodiment, camera module A is applied to back side cameras OC1 and OC2.

Camera module A has an AF function and an OIS function, and can capture an image without image blurring by automatically performing focusing at the time of capturing a subject and by optically correcting shake (vibration) caused at the time of capturing the image.

Figure 2:
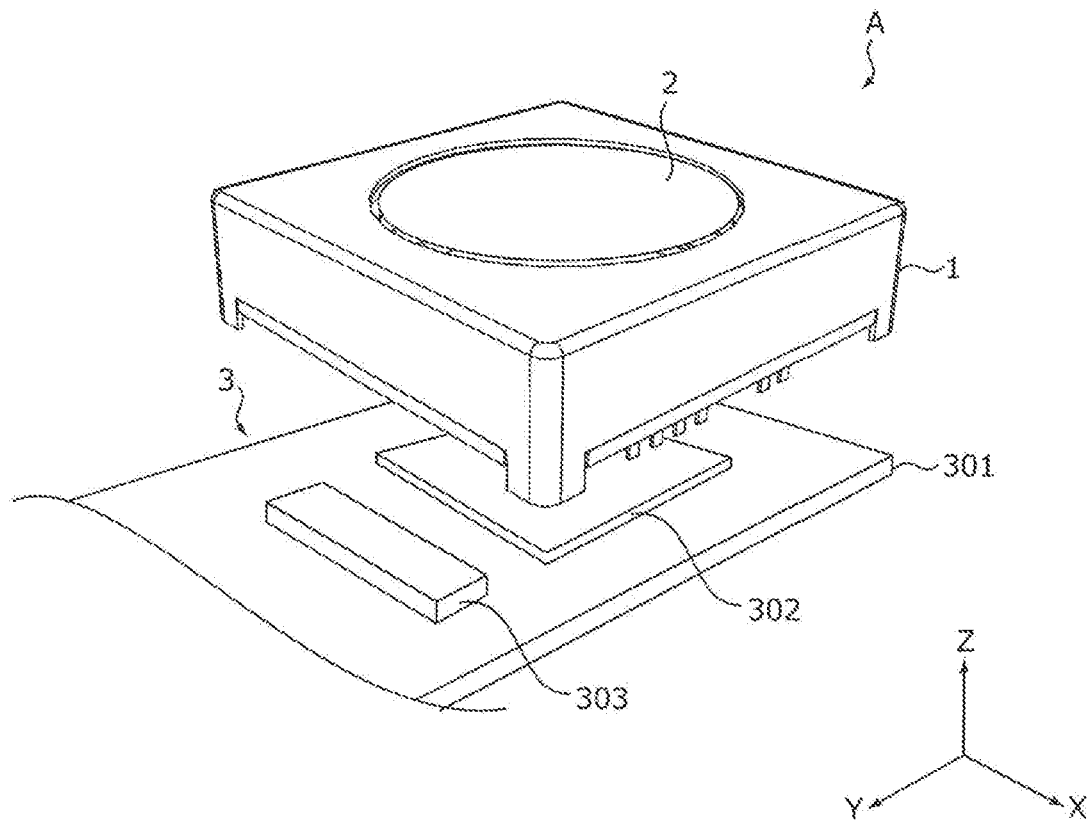
FIG. 2 is a perspective view of an external appearance of the camera module.
Figure 3A:
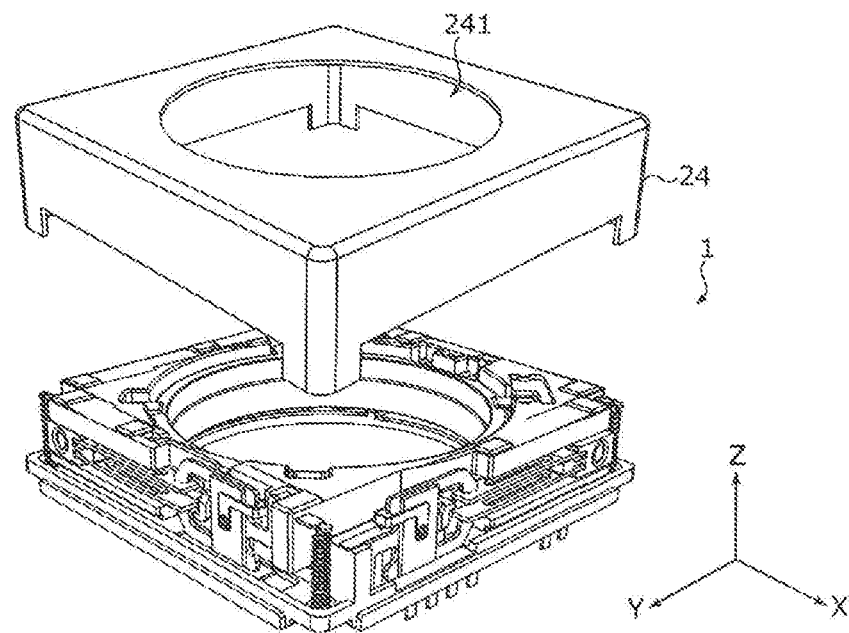
FIGS. 3A and 3B are external perspective views of an optical-element driving device according to the embodiment.
Figure 3B:
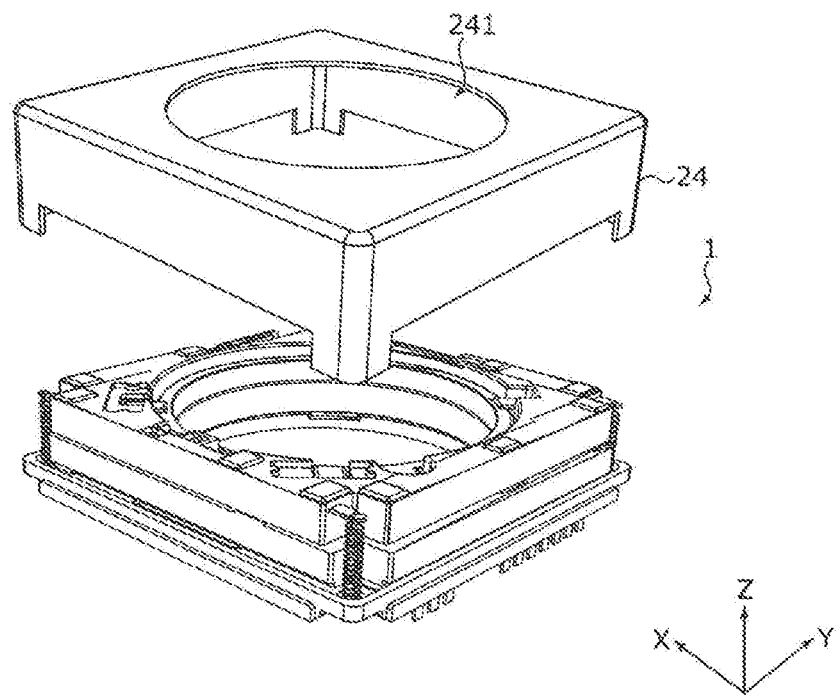

FIG. 2 is a perspective view of an external appearance of camera module A. FIGS. 3A and 3B are external perspective views of optical-element driving device 1 according to the embodiment. FIG. 3B illustrates optical-element driving device 1 rotated 180° around the Z-axis from the state of FIG. 3A. As illustrated in FIGS. 2, 3A, and 3B, the embodiment will be described using an orthogonal coordinate system (X,Y,Z). The same orthogonal coordinate system (X,Y,Z) is also used for illustration of below-mentioned figures.

Camera module A is mounted such that the vertical direction (or horizontal direction) is the X-direction, the horizontal direction (or vertical direction) is the Y-direction, and the front-rear direction is the Z-direction, for example, during actually capturing an image with smartphone M. That is, the Z-direction is the optical-axis direction, the upper side (+Z side) in the figures is the light reception side in the optical-axis direction, and the lower side (—Z side) is the image formation side in the optical-axis direction. In addition, the X- and Y-directions orthogonal to the Z-axis are referred to as "optical-axis-orthogonal directions" and the XY plane is referred to as "optical-axis-orthogonal plane."

As illustrated in FIGS. 2, 3A, and 3B, camera module A includes: optical-element driving device 1 that implements the AF function and the OIS function; lens part 2 composed of a cylindrical lens barrel and a lens housed therein; image capturing part 3 configured to capture a subject image imaged by lens part 2; and the like. That is, optical-element driving device 1 is a so-called lens driving device that drives lens part 2 as an optical element.

Image capturing part 3 is disposed on the image formation side of optical-element driving device 1 in the optical-axis direction. Image capturing part 3 includes, for example, image sensor board 301, image capturing element 302, and control part 303 mounted on image sensor board 301. Image capturing element 302 is composed of, for example, a Charge-Coupled Device (CCD) image sensor, a Complementary Metal Oxide Semiconductor (CMOS) image sensor, or the like, and captures a subject image imaged by lens part 2. Control part 303 is composed, for example, of a control IC, and performs a drive control of optical-element driving device 1. Optical-element driving device 1 is mounted on image sensor board 301 and is mechanically and electrically connected to the image sensor board. Note that control part 303 may be disposed on image sensor board 301, or may be disposed on a camera-mounted apparatus on which camera module A is mounted (smartphone M in the embodiment).

Optical-element driving device 1 is externally covered by cover 24. Cover 24 as seen in plan view in the optical-axis direction is a capped rectangular cylindrical member. In the embodiment, cover 24 as seen in plan view in the optical-axis direction has a square shape. Cover 24 includes, in its upper surface, substantially circular opening 241. Lens part 2 faces the outside via opening 241 of cover 24 and is configured to protrude from an opening surface of cover 24 on the light reception side, for example, with movement in the optical-axis direction. Cover 24 is fixed, for example, adhesively to base 21 (see FIG. 4) of OIS fixing part 20 of optical-element driving device 1.

Figure 4:
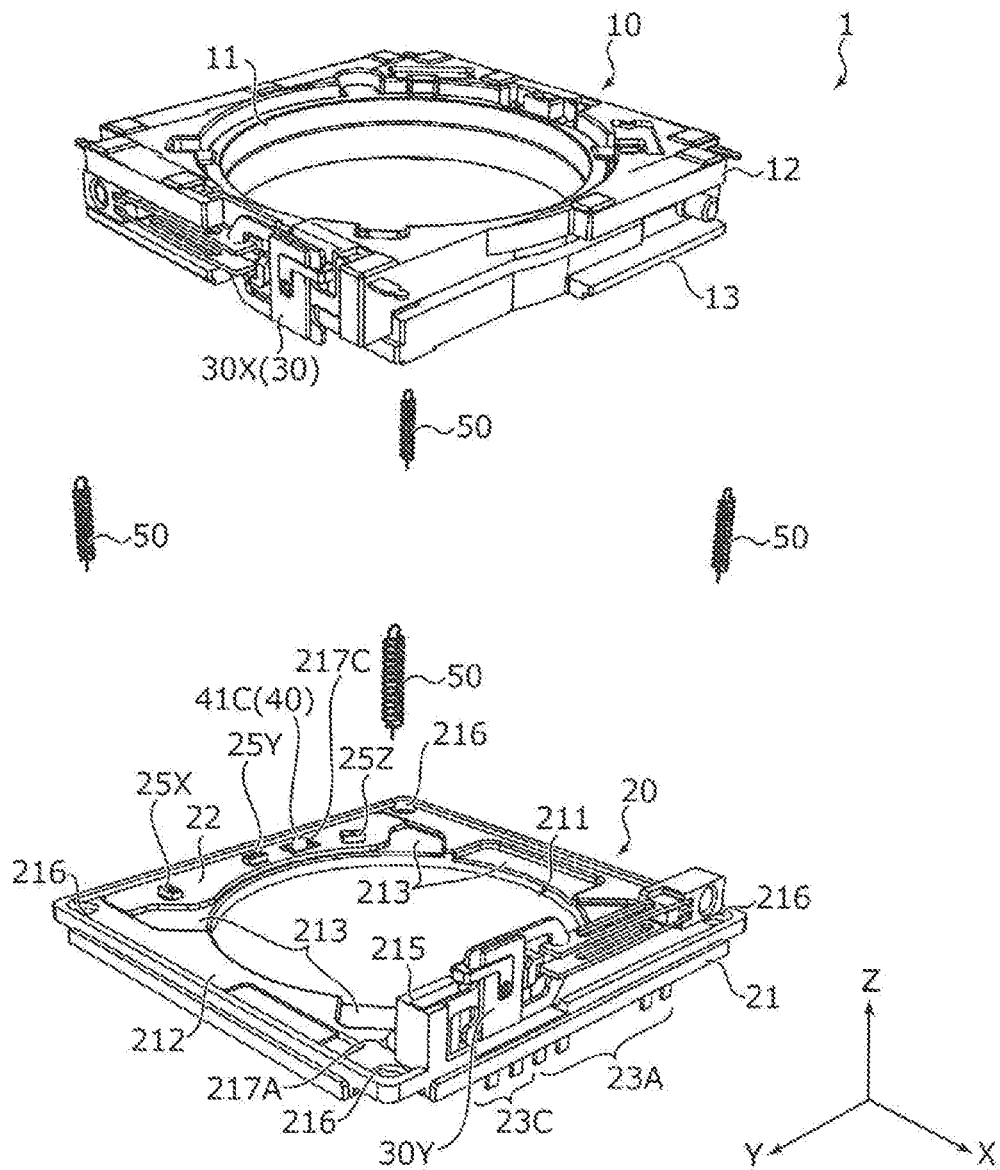
FIG. 4 is an exploded perspective view of the optical-element driving device according to the embodiment.
Figure 5:
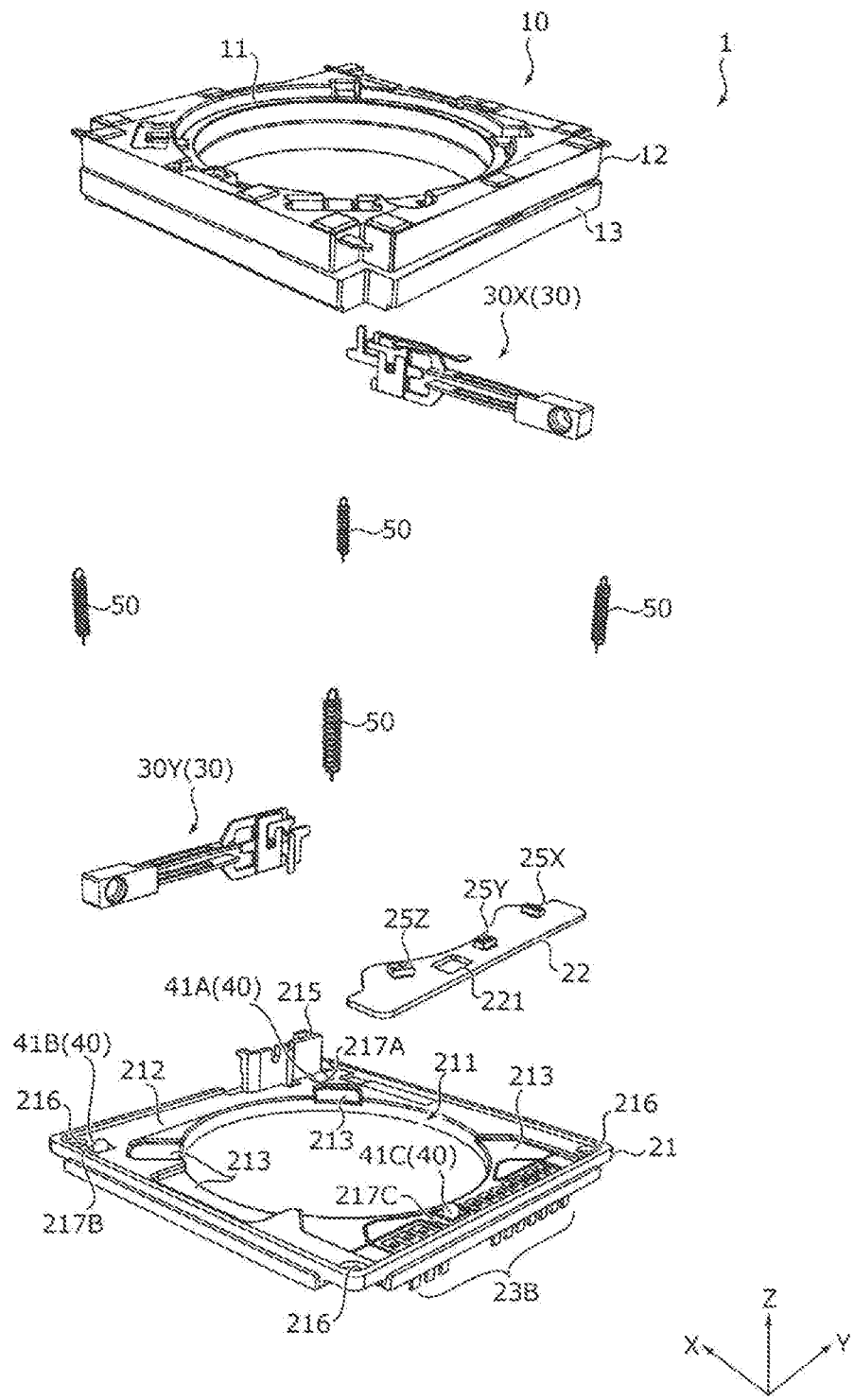
FIG. 5 is an exploded perspective view of the optical-element driving device according to the embodiment.

FIGS. 4 and 5 are exploded perspective views of optical-element driving device 1 according to the embodiment. FIG. 5 illustrates the optical-element driving device rotated 180° around the Z-axis from the state of FIG. 4. FIG. 4 illustrates the optical-element driving device to which OIS driving unit 30 and sensor board 22 are attached, and FIG. 5 illustrates the optical-element driving device from which OIS driving unit 30 and sensor board 22 are detached.

As illustrated in FIGS. 4 and 5, in the present embodiment, optical-element driving device 1 includes OIS movable part 10 (second movable part), OIS fixing part 20 (second fixing part), OIS driving unit 30 (XY-direction driving part) and OIS supporting part 40 (second supporting part). OIS driving unit 30 includes first OIS driving unit 30X (X-direction driving unit) and second OIS driving unit 30Y (Y-direction driving unit).

OIS movable part 10 is a part that sways in the optical-axis-orthogonal plane during shake correction. OIS movable part 10 includes an AF unit, second stage 13, and X-direction reference balls 42A to 42C (see FIG. 8 or the like.). The AF unit includes AF movable part 11 (first movable part), first stage 12 (first fixing part), AF driving unit 14 (Z-direction driving part), and AF supporting part 15 (first supporting part) (see FIGS. 8 to 10).

OIS fixing part 20 is a part to which OIS movable part 10 is connected via OIS supporting part 40. OIS fixing part 20 includes base 21.

OIS movable part 10 is disposed to be spaced apart from OIS fixing part 20 in the optical-axis direction, and is coupled to OIS fixing part 20 via OIS supporting part 40. Further, OIS movable part 10 and OIS fixing part 20 are biased in a direction approaching each other by OIS biasing members 50. In the present embodiment, OIS biasing members 50 are disposed at four corners of optical-element driving device 1 as seen in plan view.

In the present embodiment, for the movement in the Y-direction, entire OIS movable part 10 including the AF unit moves as a movable body. In addition, for the movement in the X-direction, only the AF unit moves as a movable body. That is, for the movement in the X-direction, second stage 13 together with base 21 constitutes OIS fixing part 20, and X-direction reference balls 42A to 42C function as OIS supporting part 40.

Base 21 is formed of, for example, a molded material made of polyarylate (PAR), a PAR alloy that is a mixture of multiple resin materials containing PAR (e.g., PAR/PC), or a liquid crystal polymer. Base 21 is a rectangular member in plan view, and includes circular opening 211 at the center of base 21.

Base 21 includes first base portion 212 and second base portions 213 forming the main surface of base 21. Second base portions 213 are disposed correspondingly to portions of OIS movable part 10 protruding on the image formation side in the optical-axis direction, i.e., protruding portions 112A to 112D of AF movable part 11 and AF motor fixing portion 125 of first stage 12 (see FIGS. 8 and 9). Second base portions 213 as seen in plan view are formed to be one size larger than protruding portions 112A to 112D and AF motor fixing portion 125, respectively, in order not to cause interference during shake correction. Sensor board 22 is disposed in an area of second base portions 213 where terminal metal fixture 23B is disposed, such that the second base portions are partly exposed (such that (portions corresponding to protruding portions 112B and 112C are exposed). Second base portions 213 are formed to be recessed with respect to first base portion 212, thereby ensuring a movement stroke of AF movable part 11 and achieving reduction of the height of optical-element driving device 1.

Figure 6:
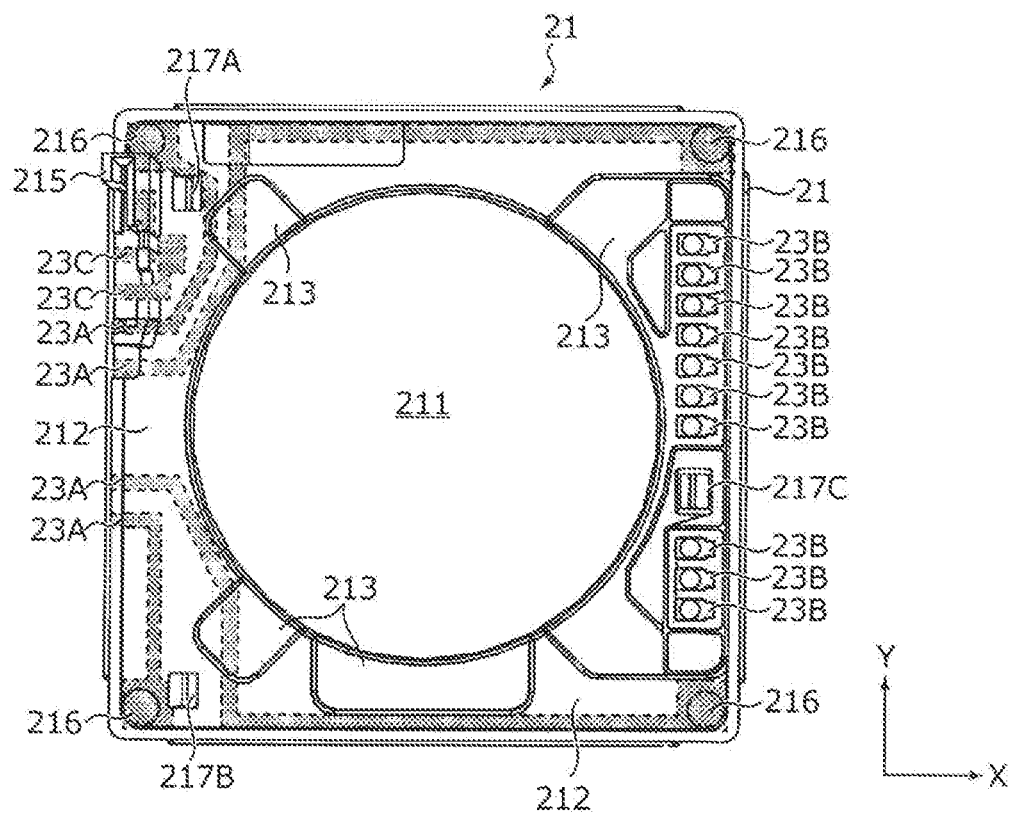
FIG. 6 is a plan view illustrating an interconnection structure of a base.

In the present embodiment, sensor board 22 is disposed in a region where AF driving unit 14 and OIS driving unit 30 are not disposed, i.e., in a region corresponding to one side (fourth side) of a rectangle that is a planar shape of base 21. Thus, it is possible to integrate power supply lines and signal lines for magnetic sensors 25X, 25Y, and 25Z, so as to simplify the interconnection structure in base 21 (see FIG. 6).

Base 21 includes OIS motor fixing portion 215 on which second OIS driving unit 30Y is disposed. OIS motor fixing portion 215 is disposed, for example, at the corner of base 21, is formed to protrude from first base portion 212 toward the light reception side in the optical-axis direction, and has a shape allowing second OIS driving unit 30Y to be held.

Terminal metal fixtures 23A to 23C are disposed in base 21, for example, by insert molding. Terminal metal fixture 23A includes a power supply line for AF driving unit 14 and first OIS driving unit 30X. For example, terminal metal fixture 23A is exposed in openings 216 formed in the four corners of base 21 and is electrically connected to OIS biasing members 50. Power supply to AF driving unit 14 and first OIS driving unit 30X is performed via OIS biasing members 50. Terminal metal fixture 23B includes power supply lines (e.g., four power supply lines) for magnetic sensors 25X, 25Y, and 25Z and signal lines (e.g., six signal lines). Terminal metal fixture 23B is electrically connected to interconnections (not illustrated) formed in sensor board 22. Terminal metal fixture 23C includes a power supply line for second OIS driving unit 30Y.

Figure 16A:
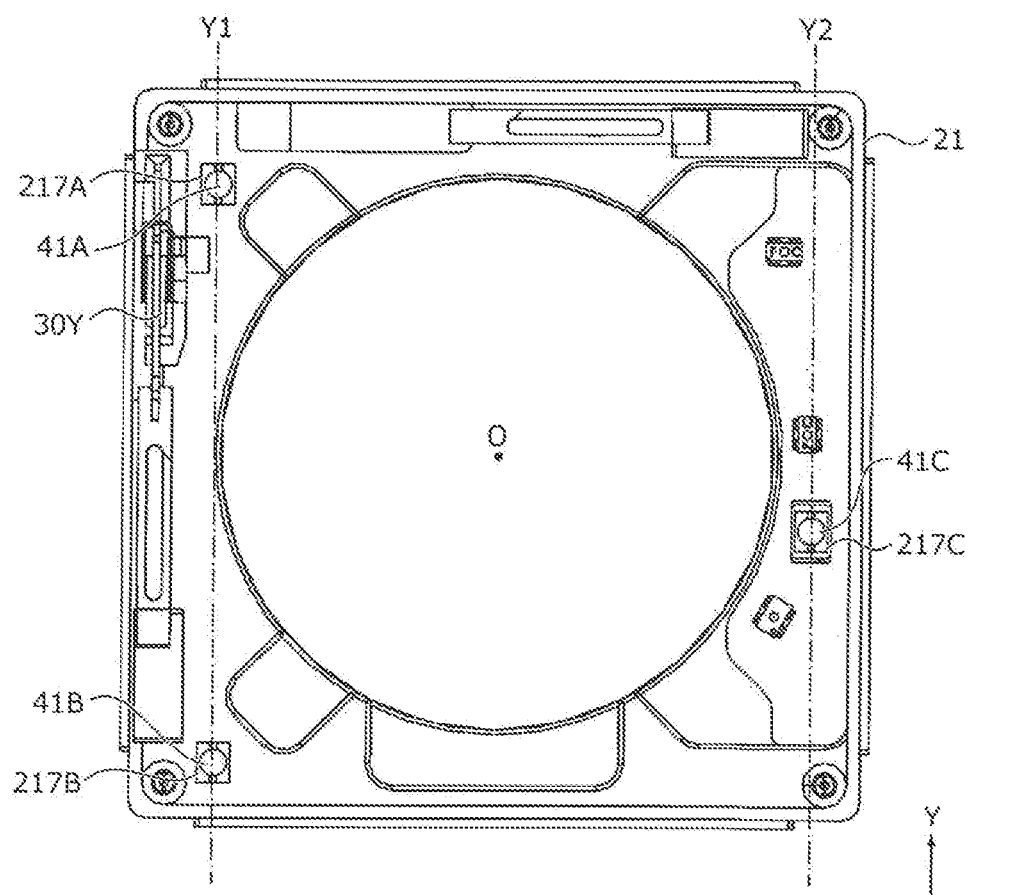
FIGS. 16A to 16C illustrate first and second Y-direction reference axes.
Figure 16B:
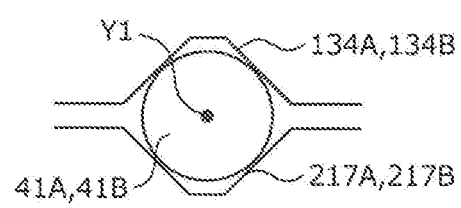
Figure 16C:
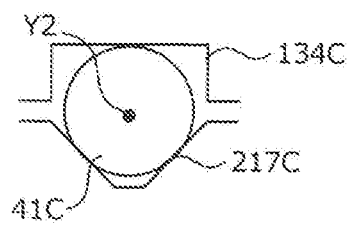

Further, base 21 includes Y-direction reference ball holding portions 217A to 217C in which Y-direction reference balls 41A to 41C constituting OIS supporting part 40 are disposed (see FIGS. 16A to 16C). Y-direction reference ball holding portions 217A to 217C are formed to be recessed in the shape of a rectangle extending in the Y-direction. Y-direction reference ball holding portions 217A to 217C are formed substantially in a V-shape (tapered shape) in a section such that the groove width tapers toward the bottom side.

In the present embodiment, Y-direction reference ball holding portions 217A and 217B are disposed in the side (third side) of base 21 where second OIS driving unit 30Y is disposed, and Y-direction reference ball holding portion 217C is disposed in the side (fourth side) where sensor board 22 is disposed. OIS movable part 10 (second stage 13) is supported at three points by Y-direction reference balls 41A to 41C.

Sensor board 22 includes the interconnections (not illustrated) including the power supply lines and the signal lines for magnetic sensors 25X, 25Y, and 25Z. Magnetic sensors 25X, 25Y, and 25Z are mounted on sensor board 22. Magnetic sensors 25X, 25Y, and 25Z are, for example, composed of a Hall element, Tunnel Magneto Resistance (TMR) sensor, or the like, and are electrically connected to terminal metal fixture 23B via the interconnections (not illustrated) formed in sensor board 22. Further, opening 221 is formed in a portion of sensor board 22 corresponding to Y-direction reference ball holding portion 217C.

Figure 10:
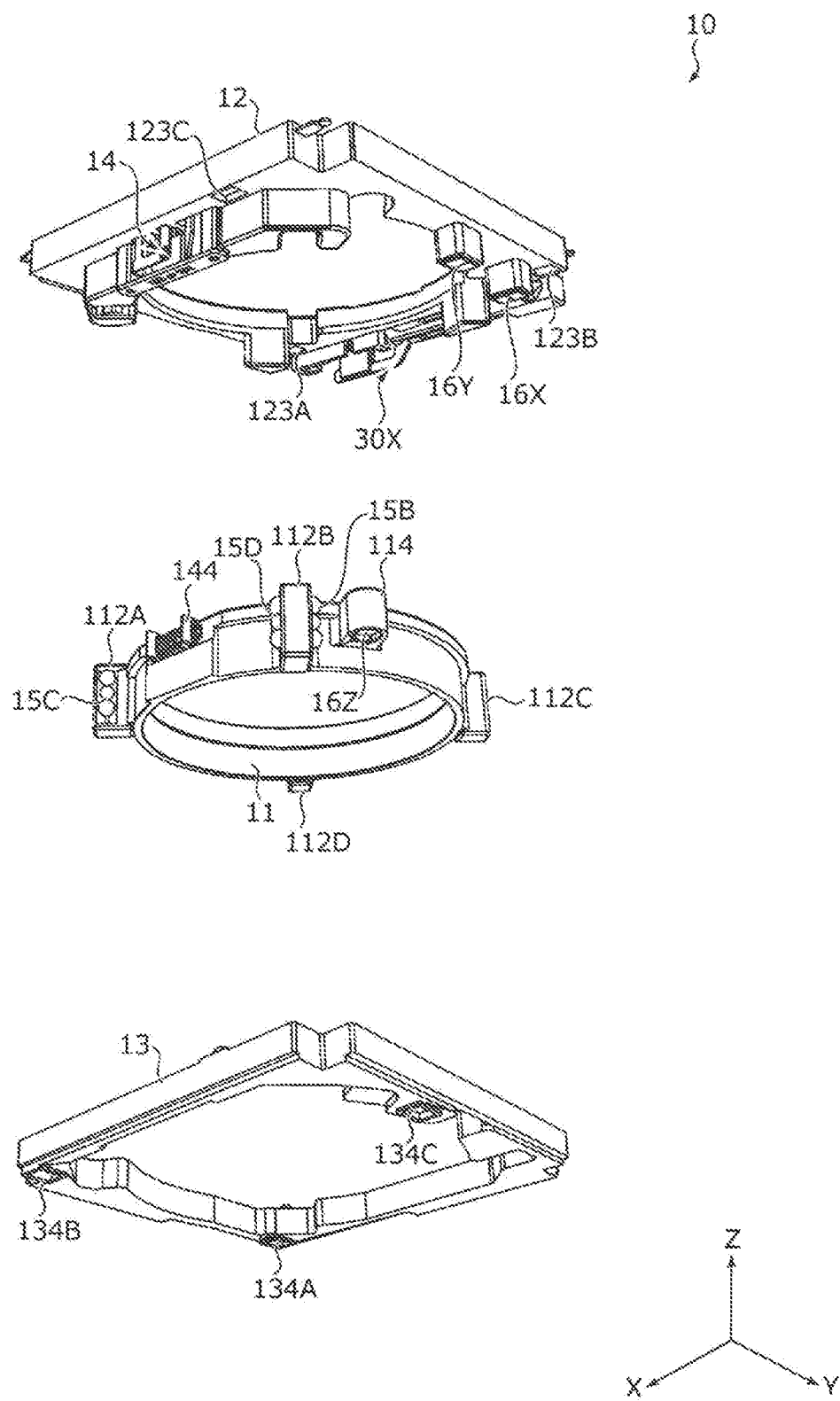
FIG. 10 is an exploded perspective view of the OIS movable part.

Magnets 16X and 16Y are disposed on first stage 12 of OIS movable part 10 at positions facing magnetic sensors 25X and 25Y (see FIG. 10). Position detecting parts composed of magnetic sensors 25X and 25Y and magnets 16X and 16Y detect the position of OIS movable part 10 in the X- and Y-directions.

Further, magnet 16Z is disposed on AF movable part 11 of OIS movable part 10 at a position facing magnetic sensor 25Z (see FIG. 10). A position detecting part composed of magnetic sensor 25Z and magnet 16Z detects the position of AF movable part 11 in the Z-direction. Note that, in place of magnets 16X, 16Y, and 16Z and magnetic sensors 25X, 25Y, and 25Z, an optical sensor such as a photoreflector may detect the position of OIS movable part 10 in the X- and Y-directions and the position of AF movable part 11 in the Z-direction.

OIS biasing members 50 include, for example, tension coil springs, and couple OIS movable part 10 to OIS fixing part 20. In the present embodiment, one ends of OIS biasing members 50 are connected to terminal metal fixture 23A of base 21, and the other ends are connected to interconnections 17A and 17B of first stage 12. OIS biasing members 50 are subjected to a tensile load when OIS movable part 10 is coupled to OIS fixing part 20, and act on OIS movable part 10 and OIS fixing part 20 such that OIS movable part 10 and OIS fixing part 20 approach each other. That is, OIS movable part 10 is held to be capable of swaying in the XY plane by OIS biasing members 50 while biased in the optical-axis direction (while pressed against base 21). Thus, it is possible to hold OIS movable part 10 stably without rattling.

Moreover, in the present embodiment, OIS biasing members 50 function as power supply lines for AF driving unit 14 and first OIS driving unit 30X.

OIS supporting part 40 supports OIS movable part 10 with respect to OIS fixing part 20 in a state where OIS movable part 10 is spaced apart from OIS fixing part 20 in the optical-axis direction. In the present embodiment, OIS supporting part 40 includes three Y-direction reference balls 41A to 41C interposed between OIS movable part 10 (second stage 13) and base 21.

Figure 8:
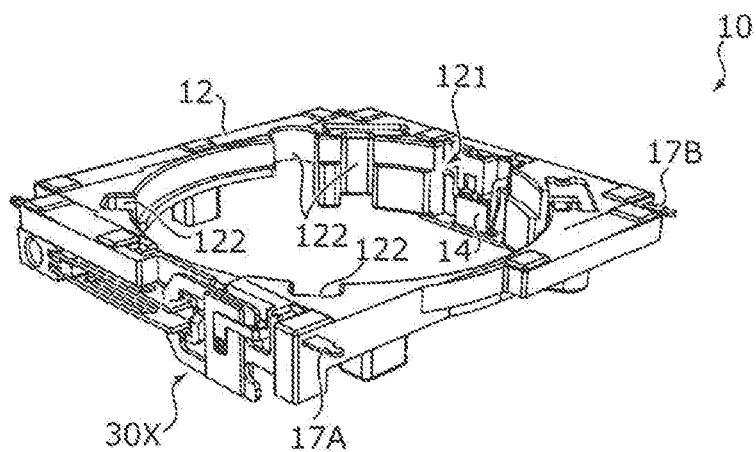
FIG. 8 is an exploded perspective view of an OIS movable part.
Figure 8:
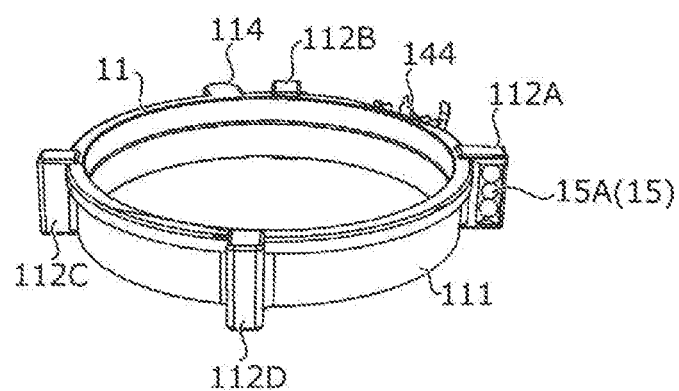
Figure 8:
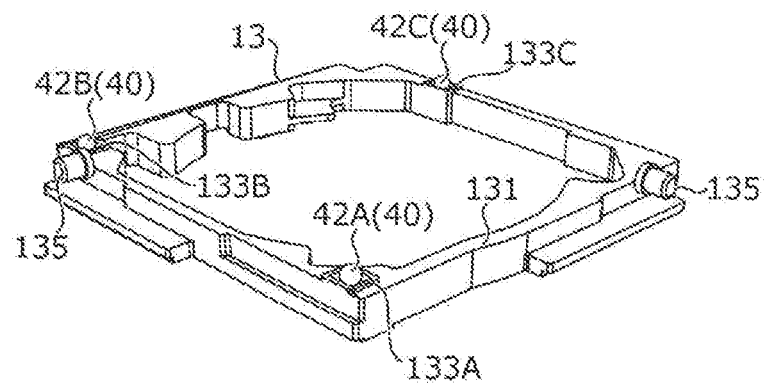
Figure 8:
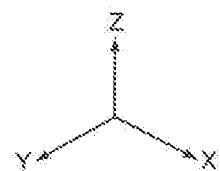

Further, OIS supporting part 40 includes three X-direction reference balls 42A to 42C interposed between first stage 12 and second stage 13 in OIS movable part 10 (see FIG. 8 or the like).

In the present embodiment, restricting the directions in which Y-direction reference balls 41A to 41C and X-direction reference balls 42A to 42C (total of six balls) are rollable allows OIS movable part 10 to sway in the XY plane accurately. Note that, the number of Y-direction reference balls and X-direction reference balls constituting OIS supporting part 40 can be appropriately changed.

OIS driving unit 30 is an actuator that moves OIS movable part 10 in the X- and Y-directions. Specifically, OIS driving unit 30 is composed of first OIS driving unit 30X (first XY-direction driving unit) for moving OIS movable part 10 (AF unit alone) in the X-direction, and second OIS driving unit 30Y (second XY-direction driving unit) for moving entire OIS movable part 10 in the Y-direction.

Each of first OIS driving unit 30X and second OIS driving unit 30Y is composed of an ultrasonic motor. First OIS driving unit 30X is fixed to OIS motor fixing portion 124 extending along the X-direction of first stage 12 (see FIG. 9). Second OIS driving unit 30Y is fixed to OIS motor fixing portion 215 of base 21 in such a manner as to extend along the Y-direction. That is, first OIS driving unit 30X and second OIS driving unit 30Y are disposed along the sides orthogonal to each other.

Figure 7A:
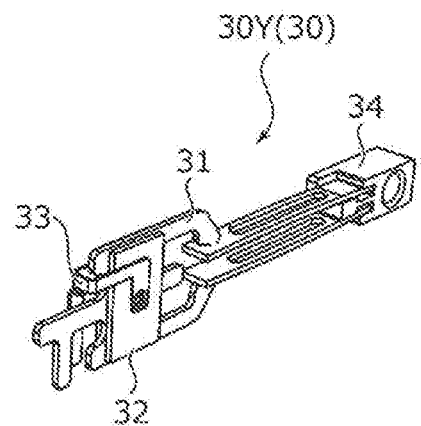
FIGS. 7A and 7B are perspective views of an OIS driving unit.
Figure 7B:
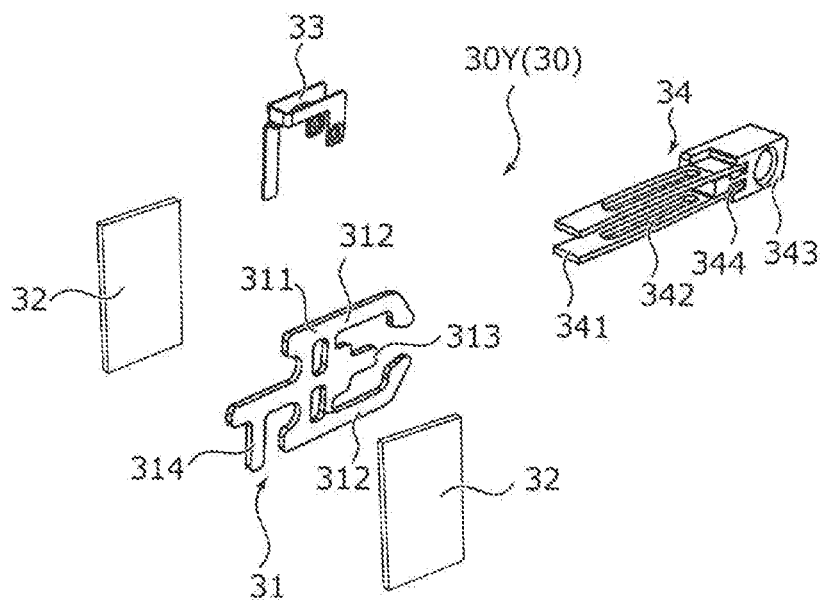

The configuration of OIS driving unit 30 is illustrated in FIGS. 7A and 7B. FIG. 7A illustrates OIS driving unit 30 whose members are assembled, and FIG. 7B illustrates OIS driving unit 30 whose members are disassembled. Note that, although FIGS. 7A and 7B illustrate second OIS driving unit 30Y, the illustrations are treated as illustrations of OIS driving unit 30 since the principal configuration of first OIS driving unit 30X, specifically, the configuration excluding the shape of OIS electrode 33, is the same as that of second OIS driving unit 30Y.

As illustrated in FIGS. 7A and 7B, OIS driving unit 30 includes OIS resonant portion 31, OIS piezoelectric elements 32, OIS electrode 33, and OIS power transmission part 34. The driving force of OIS driving unit 30 is transmitted to second stage 13 via OIS power transmission part 34. Specifically, first OIS driving unit 30X is connected to second stage 13 via first OIS power transmission part 34X, and second OIS driving unit 30Y is connected to second stage 13 via second OIS power transmission part 34Y. That is, in OIS driving unit 30, OIS resonant portion 31 is an active element, and OIS power transmission part 34 is a passive element.

OIS piezoelectric elements 32 are, for example, plate-shaped elements formed of a ceramic material, and generate a vibration under high-frequency voltage application. Two OIS piezoelectric elements 32 are disposed to sandwich body portion 311 of OIS resonant portion 31.

OIS electrode 33 holds OIS resonant portion 31 and OIS piezoelectric elements 32 in between, and applies a voltage to OIS piezoelectric elements 32. OIS electrode 33 of first OIS driving unit 30X is electrically connected to interconnection 17A of first stage 12, and OIS electrode 33 of second OIS driving unit 30Y is electrically connected to terminal metal fixture 23C of base 21.

OIS resonant portion 31 is formed of a conductive material and resonates with the vibration of OIS piezoelectric elements 32 to convert the vibrational motion into a linear motion. OIS resonant portion 31 is formed, for example, by laser processing, etching processing, press working, or the like of a metal plate. In the present embodiment, OIS resonant portion 31 includes substantially rectangular body portion 311 sandwiched by OIS piezoelectric elements 32, two arm portions 312 extending in the X- or Y-direction from the upper and lower portions of body portion 311, protruding portion 313 extending in the X- or Y-direction from the central portion of body portion 311, and energization portion 314 extending from the central portion of body portion 311 on the opposite side of protruding portion 313. Two arm portions 312 have symmetrical shapes whose free end portions make contact with OIS power transmission part 34 and symmetrically deform in resonance with the vibration of OIS piezoelectric elements 32. Energization portion 314 of first OIS driving unit 30X is electrically connected to interconnection 17A of first stage 12, and energization portion 314 of second OIS driving unit 30Y is electrically connected to terminal metal fixture 23C of base 21.

OIS piezoelectric elements 32 are bonded to body portion 311 of OIS resonant portion 31 in the thickness direction and are held in between by OIS electrode 33, so that these are electrically connected to one another. For example, one side of a power supply path is connected to OIS electrode 33, and the other side is connected to energization portion 314 of OIS resonant portion 31. A voltage is applied to OIS piezoelectric elements 32, and a vibration is thus generated.

OIS resonant portion 31 has at least two resonant frequencies, and deforms in behaviors different between the resonant frequencies. In other words, the entire shape of OIS resonant portion 31 is set such that OIS resonant portion 31 deforms in behaviors different between the two resonant frequencies. The different behaviors include a behavior causing OIS power transmission part 34 to move forward in the X- or Y-direction, and a behavior causing OIS power transmission part 34 to move backward in the X- or Y-direction.

OIS power transmission part 34 is a chucking guide extending in one direction, whose one end is connected to arm portions 312 of OIS resonant portion 31 and whose other end is connected to second stage 13. OIS power transmission part 34 includes OIS motor contact portions 341, stage fixing portion 343, and coupling portion 342. OIS motor contact portions 341 make contact with the free end portions of arm portions 312 of OIS resonant portion 31. Stage fixing portion 343 is disposed at an end portion of OIS power transmission part 34 and is fixed to OIS chucking guide fixing portion 135 of second stage 13 (see FIG. 8 and the like). Coupling portion 342 is a portion that couples OIS motor contact portions 341 to stage fixing portion 343, and is formed to branch into two and extend from stage fixing portion 343 such that the two branch portions are substantially parallel with each other.

The width between OIS motor contact portions 341 is set wider than the width between the free end portions of arm portions 312 of OIS resonant portion 31. For example, it is possible to widen the width between OIS motor contact portions 341 by interposing, between two branches of coupling portion 342 at a connecting portion between coupling portion 342 and stage fixing portion 343, spacing portion 344 that is larger than the width between connection end portions. Thus, when OIS power transmission part 34 is attached between arm portions 312 of OIS resonant portion 31, coupling portion 342 functions as leaf springs, and a biasing force acts on arm portions 312 in the direction of pushing out arm portion 312. This biasing force allows OIS power transmission part 34 to be held between the free end portions of arm portions 312. Accordingly, the driving force from OIS resonant portion 31 is efficiently transmitted to OIS power transmission part 34. Spacing portion 344 is formed integrally with stage fixing portion 343, for example.

Figure 17:
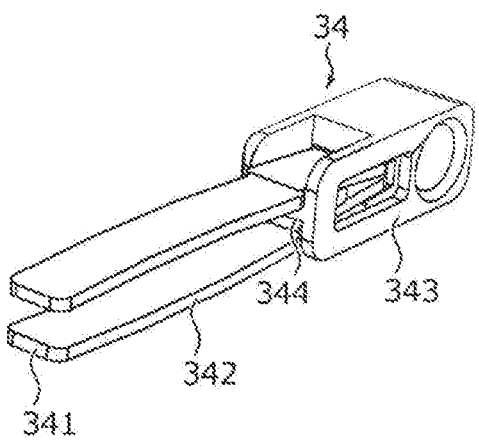
FIG. 17 is a diagram illustrating one example of an OIS power transmission part.

Note that, although attached portions of coupling portion 342 are released on one side at stage fixing portion 343 in the example illustrated in FIGS. 7A and 7B, stage fixing portion 343 may have a structure for sandwiching the base of coupling portion 342 (the end portions of the coupling portion on the stage fixing portion 343 side) as illustrated in FIG. 17. In this case, it is possible to prevent coupling portion 342 from being displaced over time to come off, and the reliability is thus improved.

OIS resonant portion 31 and OIS power transmission part 34 are only in contact with each other in a biased state; hence, it is possible to lengthen the movement stroke of OIS movable part 10 only by increasing the contact portions in the X- or Y-direction without enlarging the outer shape of optical-element driving device 1.

First OIS driving unit 30X is fixed to OIS movable part 10 (first stage 12) and is connected to second stage 13 via OIS power transmission part 34X, and moves together with OIS movable part 10 during shake correction performed by second OIS driving unit 30Y in the Y-direction. On the other hand, second OIS driving unit 30Y is fixed to OIS fixing part 20 (base 21) and is connected to second stage 13 via OIS power transmission part 34Y, and is not affected by shake correction performed by first OIS driving unit 30X in the X-direction. That is, the movement of OIS movable part 10 by one of OIS driving units 30 is not hindered by the structure of the other one of OIS driving units 30. Therefore, it is possible to prevent rotation of OIS movable part 10 around the Z-axis, so as to allow OIS movable part 10 to sway in the XY plane accurately.

Figure 9:
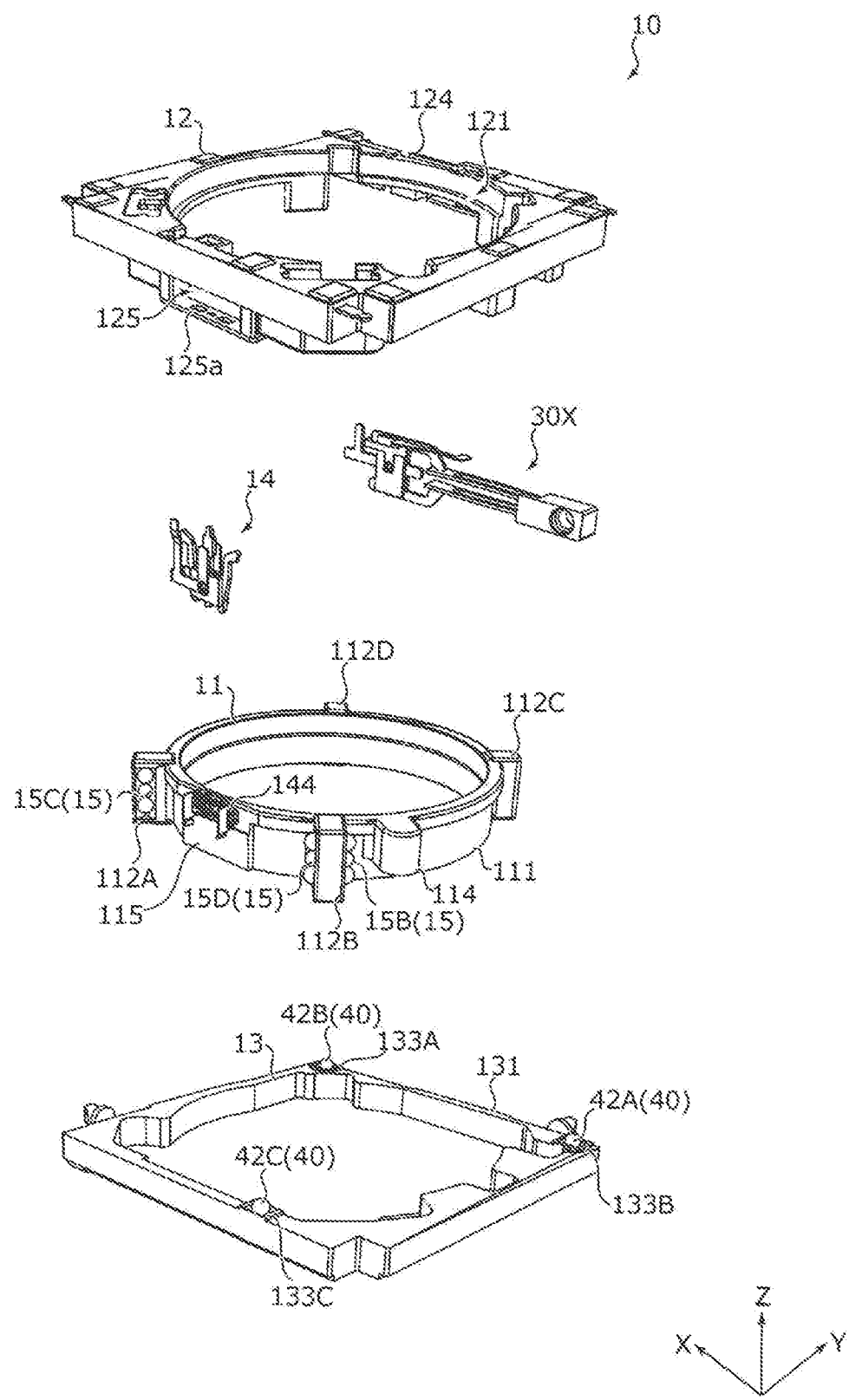
FIG. 9 is an exploded perspective view of the OIS movable part.

FIGS. 8 to 10 are exploded perspective views of OIS movable part 10. FIG. 9 illustrates OIS movable part 10 rotated 180° around the Z-axis from the state of FIG. 8. FIG. 10 is a lower perspective view illustrating OIS movable part 10 rotated 180° around the Z-axis from the state of FIG. 8. Note that, FIG. 9 illustrates a state where AF driving unit 14 and first OIS driving unit 30X are detached from first stage 12.

In the following, in a rectangle that is a planar shape of optical-element driving device 1, the side where AF driving unit 14 is disposed is referred to as "first side," the side where first OIS driving unit 30X is disposed is referred to as "second side," the side where second OIS driving unit 30Y is disposed is referred to as "third side," and the remaining one side is referred to as "fourth side."

As illustrated in FIGS. 8 to 10, in the present embodiment, OIS movable part 10 includes AF movable part 11, first stage 12, second stage 13, AF driving unit 14, AF supporting part 15, and the like. For the movement in the Y-direction, entire OIS movable part 10 including first stage 12 and second stage 13 is a movable body, whereas for the movement in the X-direction, second stage 13 functions as OIS fixing part 20 and only the AF unit (AF movable part 11 and first stage 12) functions as OIS movable part 10. Further, first stage 12 functions as an AF fixing part for supporting AF movable part 11.

AF movable part 11 is a lens holder for holding lens part 2 (see FIG. 2), and moves in the optical-axis direction during focusing. AF movable part 11 is disposed to be spaced radially inward from first stage 12 (AF fixing part), and is supported via AF supporting part 15 while biased toward first stage 12.

AF movable part 11 is formed of, for example, polyarylate (PAR), a PAR alloy that is a mixture of multiple resin materials containing PAR, a liquid crystal polymer, or the like. AF movable part 11 includes cylindrical lens housing 111. Lens part 2 is fixed to the inner peripheral surface of lens housing 111, for example, adhesively.

AF movable part 11 includes, at the outer circumferential surface of lens housing 111, protruding portions 112A to 112D protruding radially outward and extending in the optical-axis direction. It is preferable that protruding portions 112A to 112D be disposed symmetrically with respect to the optical axis. In the present embodiment, protruding portions 112A to 112D are disposed around the optical axis at approximately 90° intervals. Protruding portions 112A to 112D protrude on the image formation side in the optical-axis direction beyond the lower surface of lens housing 111, and make contact with second base portions 213 of base 21, to restrict the movement of AF movable part 11 on the image formation side (lower side) in the optical-axis direction. In the present embodiment, protruding portions 112A to 112D make contact with second base portions 213 of base 21 in a reference state in which AF driving unit 14 is not driven.

Protruding portions 112A and 112B on the AF driving unit 14 side, together with first stage 12, hold AF supporting part 15 (see FIGS. 13A to 13C and 14A to 14C). In one of the protruding portions (protruding portion 112A), first Z-direction reference ball holding portion 112a for accommodating first Z-direction reference balls 15A constituting AF supporting part 15 is formed. In the other one of the protruding portions (protruding portion 112B), second Z-direction reference ball holding portion 112b for accommodating second Z-direction reference balls 15B constituting AF supporting part 15 is formed. Further, first pressurization ball holding portion 112c and second pressurization ball holding portion 112d for respectively accommodating first pressurization balls 15C and second pressurization balls 15D constituting AF supporting part 15 are formed respectively in the surfaces of protruding portions 112A and 112B which are respectively opposite to first Z-direction reference ball holding portion 112a and second Z-direction reference ball holding portion 112b.

First Z-direction reference ball holding portion 112a, second Z-direction reference ball holding portion 112b, first pressurization ball holding portion 112c, and second pressurization ball holding portion 112d as seen in cross section are formed substantially in a V-shape (tapered shape) such that the groove widths decrease in the pressing direction of the balls. Further, light-reception-side stopper 112e and image-formation-side stopper 112f for preventing AF supporting part 15 from falling off are disposed respectively on a light-reception-side end portion and an image-formation-side end portion of each of protruding portions 112A and 112B in the optical-axis direction.

Further, magnet housing 114 for housing magnet 16Z for Z position detection is disposed on the outer circumferential surface of lens housing 111. Magnet 16Z is disposed in magnet housing 114. Magnetic sensor 25Z for Z position detection is disposed on sensor board 22 at a position facing magnet 16Z in the optical-axis direction (see FIG. 4).

In addition, in AF movable part 11, driving-unit housing 115 is disposed between protruding portions 112A and 112B. AF power transmission part 144, which is a passive element of AF driving unit 14, is disposed on driving-unit housing 115. AF power transmission part 144 is a chucking guide having a predetermined length in the Z-direction, and has sidewalls facing each other in the X-direction and protruding (on the −side) in the Y-direction. Arm portions 141b of resonant portion 141 of AF driving unit 14 make contact with AF power transmission part 144 to push out the sidewalls of AF power transmission part 144, and the power of AF driving unit 14 is transmitted to AF movable part 11. When two arm portions 141b make contact with the sidewalls of AF power transmission part 144, the sidewalls of AF power transmission part 144 function as leaf springs, whereby the driving force generated by deformation of resonant portion 141 is efficiently transmitted.

Figure 19A:
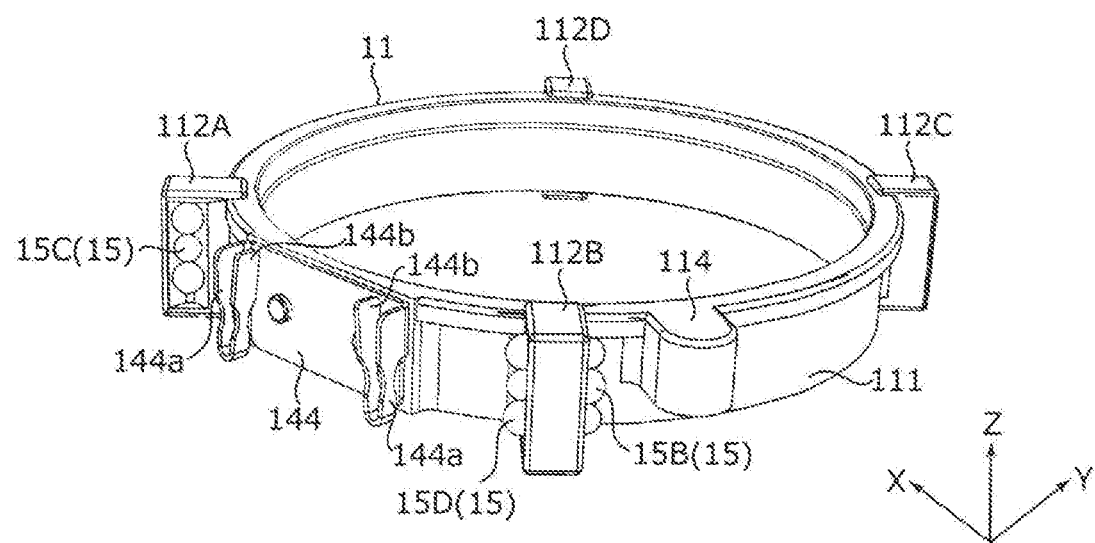
FIGS. 19A and 19B are diagrams illustrating one exemplary AF power transmission part.
Figure 19B:
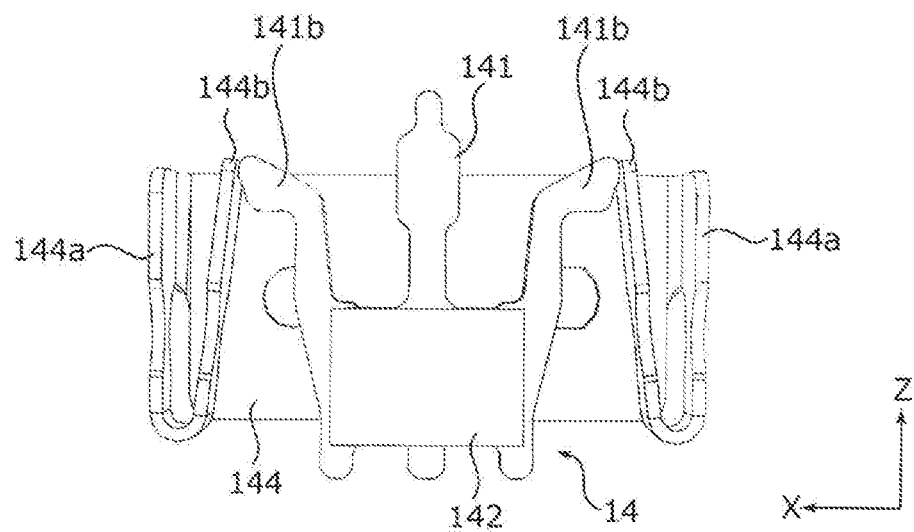

Note that, the structure of AF power transmission part 144 can be arbitrarily changed as appropriate. For example, as illustrated in FIGS. 19A and 19B, sidewalls 144a extending in the Z-direction may be folded back in a hairpin shape to be inclined inward with respect to the Z-direction to form leaf springs 144b such that biasing forces are exerted in directions of pushing back arm portions 141b of AF driving unit 14. With this configuration, the driving force caused by the deformation of AF resonant portion 141 is more efficiently transmitted to AF power transmission part 144.

In the present embodiment, AF power transmission part 144 is formed by a member separate from AF movable part 11. AF power transmission part 144 has a U-shape in plan view, for example, and is fixed, at the bottom surface portion, to the outer circumferential surface of lens housing 111 in a state where the side surface portions face each other in the X-direction. AF power transmission part 144 is formed of a metal material such as, for example, titanium copper, nickel copper, stainless steel. Thus, as compared with the case where arm portions 141b of AF driving unit 14 make contact with AF movable part 11 that is a resin molded article, the driving force of AF driving unit 14 is efficiently transmitted. Note that, AF power transmission part 144 may be integrally molded with AF movable part 11.

First stage 12 supports AF movable part 11 via AF supporting part 15. Second stage 13 is disposed on the image formation side of first stage 12 in the optical-axis direction via X-direction reference balls 42A to 42C. First stage 12 moves in the X- and Y-directions during shake correction, and second stage 13 moves only in the Y-direction during shake correction.

First stage 12 as seen in plan view in the optical-axis direction is a member having a substantially rectangular shape, and is formed of, for example, a liquid crystal polymer. First stage 12 has substantially circular opening 121 at a portion corresponding to AF movable part 11. Cutout portions 122 corresponding to protruding portions 112A to 112D and magnet housing 114 of AF movable part 11 are formed in opening 121. A portion of first stage 12 corresponding to first OIS driving unit 30X (the outer surface of the sidewall along the second side) is formed to be recessed radially inward such that first OIS driving unit 30X can be disposed without protruding radially outward (OIS motor fixing portion 124). Further, a portion of first stage 12 corresponding to second OIS driving unit 30Y (the outer surface of the sidewall along the third side) is also similarly formed to be recessed radially inward.

Figure 15A:
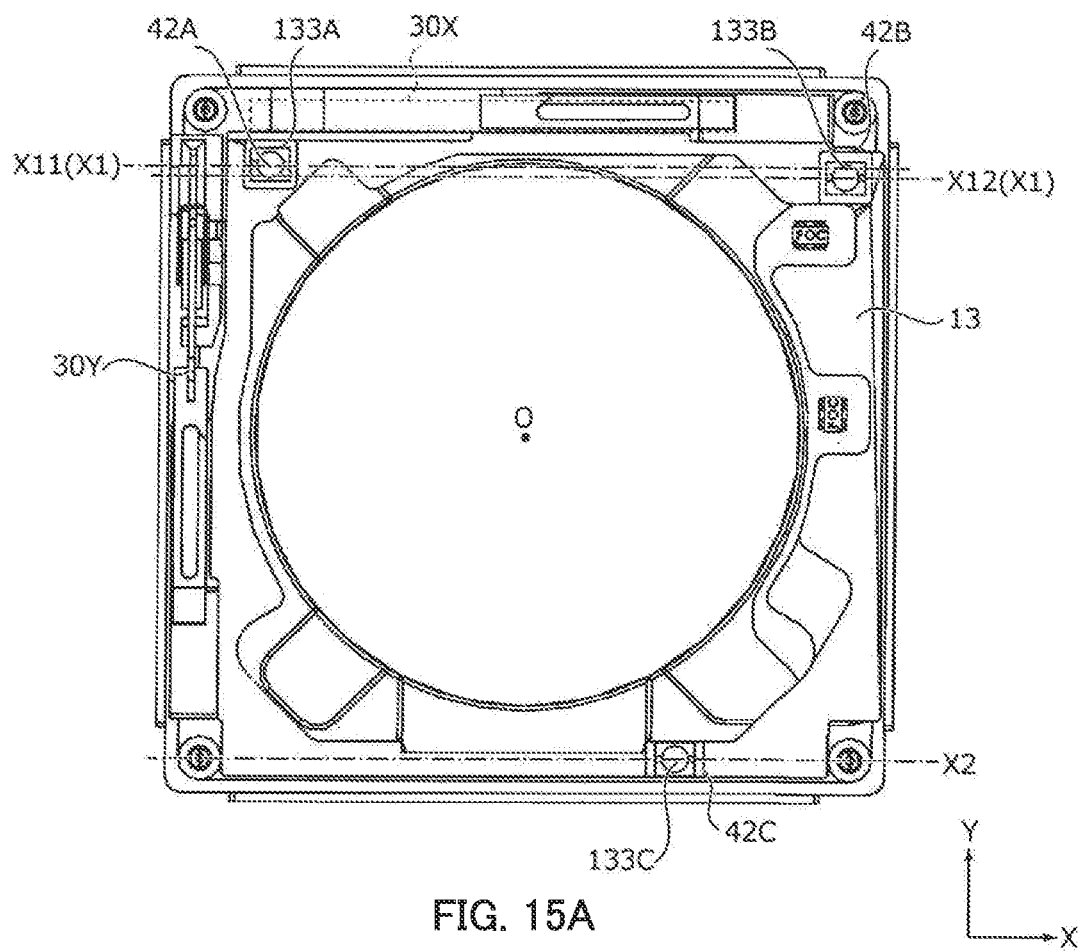
FIGS. 15A to 15C illustrate first and second X-direction reference axes.
Figure 15B:
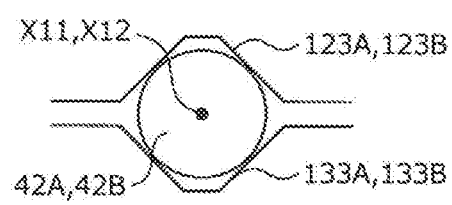
Figure 15C:
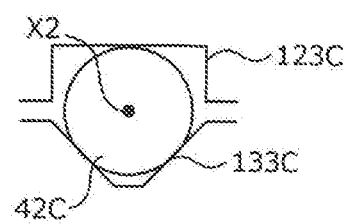

First stage 12 includes, at the lower surface, X-direction reference ball holding portions 123A to 123C for holding X-direction reference balls 42A to 42C (see FIGS. 15B and 15C). X-direction reference ball holding portions 123A to 123C are formed to be recessed in a rectangular shape extending in the X-direction. X-direction reference ball holding portions 123A to 123C face X-direction reference ball holding portions 133A to 133C of second stage 13 in the Z-direction. X-direction reference ball holding portions 123A and 123B are formed substantially in a V-shape (tapered shape) in a section such that the groove width tapers toward the bottom side, and X-direction reference ball holding portion 123C is formed substantially in a U-shape.

Figure 13A:
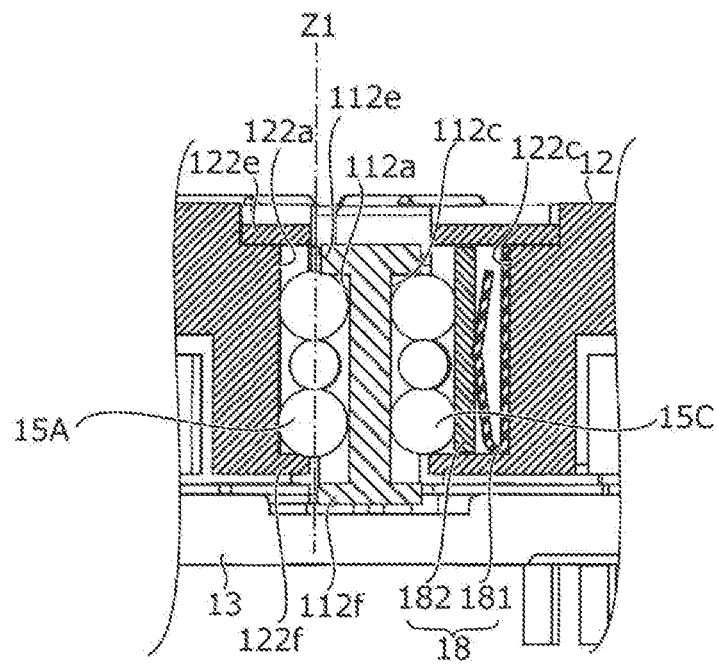
FIGS. 13A and 13B are diagrams illustrating a first Z-direction reference axis.
Figure 13B:
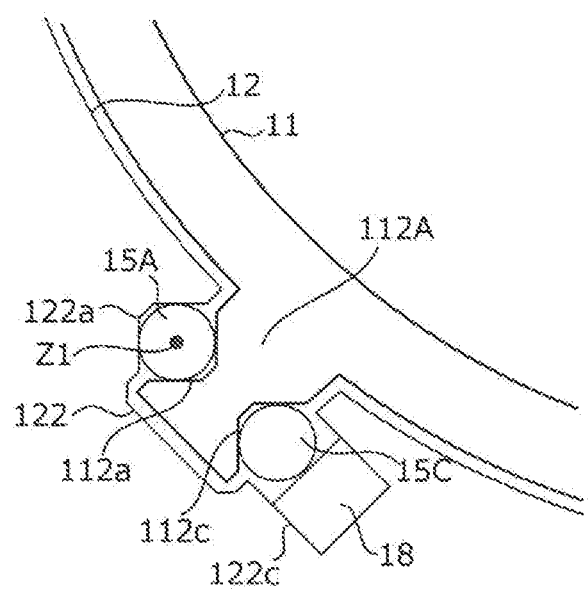

In first stage 12, first Z-direction reference ball holding portion 122a and first pressurization ball holding portion 122c are disposed on the inner surface of cutout portion 122 corresponding to protruding portion 112A of AF movable part 11 (see FIGS. 13A and 13B). First Z-direction reference ball holding portion 122a holds first Z-direction reference balls 15A between first Z-direction reference ball holding portion 122a and first Z-direction reference ball holding portion 112a of AF movable part 11. First pressurization ball holding portion 122c holds first pressurization balls 15C between first pressurization ball holding portion 122c and first pressurization ball holding portion 112c of AF movable part 11.

Figure 14A:
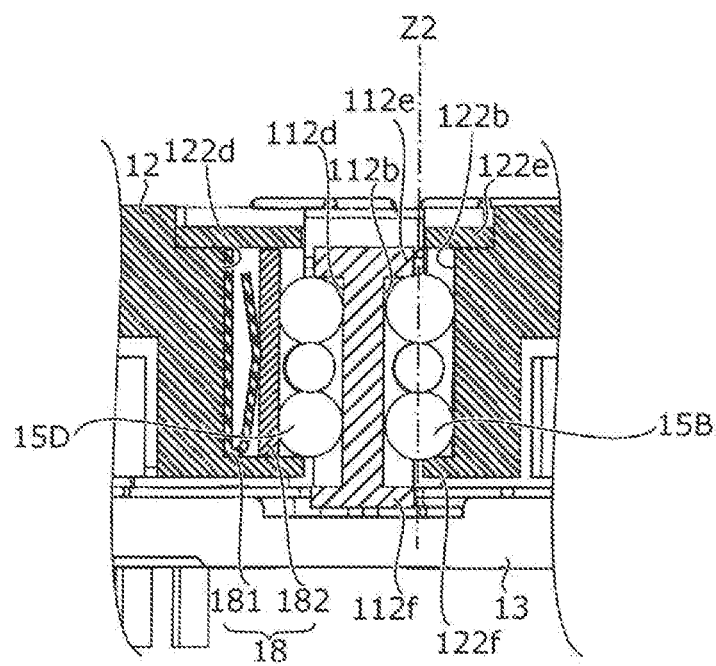
FIGS. 14A and 14B are diagrams illustrating a second Z-direction reference axis.
Figure 14B:
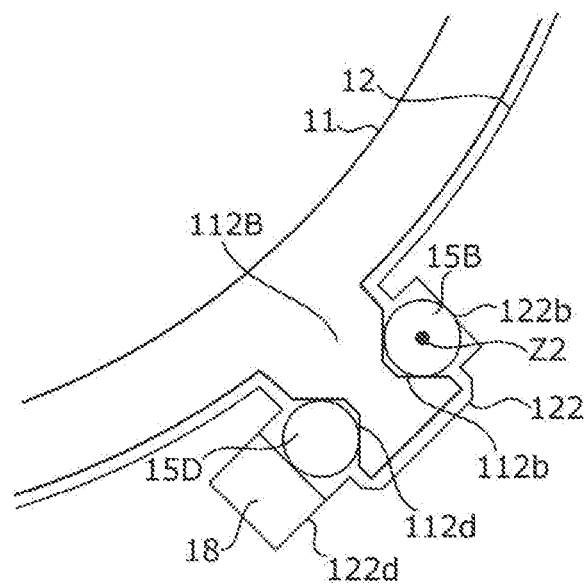

Further, in first stage 12, second Z-direction reference ball holding portion 122b and second pressurization ball holding portion 122d are disposed on the inner surface of cutout portion 122 corresponding to protruding portion 112B of AF movable part 11 (see FIGS. 14A and 14B). Second Z-direction reference ball holding portion 122b holds second Z-direction reference balls 15B between second Z-direction reference ball holding portion 122b and second Z-direction reference ball holding portion 112b of AF movable part 11. Second pressurization ball holding portion 122d holds second pressurization balls 15D between second pressurization ball holding portion 122d and second pressurization ball holding portion 112d of AF movable part 11.

First Z-direction reference ball holding portion 122a is formed substantially in a V-shape (tapered shape) in cross section such that the groove width decreases toward the bottom surface side. Second Z-direction reference ball holding portion 122b, first pressurization ball holding portion 122c, and second pressurization ball holding portion 122d are formed to have a substantially U-shaped section. Further, light-reception-side stopper 112e and image-formation-side stopper 112f for preventing AF supporting part 15 from falling off are disposed on the light-reception-side end portion and the image-formation-side end portion of each of first Z-direction reference ball holding portion 122a and first pressurization ball holding portion 122c in the optical-axis direction, and on the light-reception-side end portion and the image-formation-side end portion of each of second Z-direction reference ball holding portion 122b and second pressurization ball holding portion 122d in the optical-axis direction.

In first stage 12, AF motor fixing portion 125 in which AF resonant portion 141, which is an active element of AF driving unit 14, and the like are disposed is formed on one sidewall along the X-direction (sidewall along the first side). AF motor fixing portion 125 includes an upper fixing plate (whose reference numeral is omitted) and lower fixing plate 125a, and AF resonant portion 141 is sandwiched between these plates. AF resonant portion 141 is inserted into, for example, an insertion hole (whose reference numeral is omitted) formed in the upper fixing plate and lower fixing plate 125a, and fixed by adhesion. The upper fixing plate is formed by a part of interconnection 17B, and AF resonant portion 141 is electrically connected to interconnection 17B.

Magnets 16X and 16Y for detecting the XY position are disposed on one of the sidewalls of first stage 12 extending along the Y-direction (the sidewall along the fourth side). For example, magnet 16X is magnetized in the X-direction, and magnet 16Y is magnetized in the Y-direction. Magnetic sensors 25X and 25Y for detecting the XY position are disposed on sensor board 22 at positions facing magnets 16X and 16Y in the optical-axis direction (see FIG. 4).

In addition, interconnections 17A and 17B are embedded in first stage 12, for example, by insert molding. Interconnections 17A and 17B are disposed, for example, along the first side and the second side. Interconnections 17A and 17B are exposed at the four corners of first stage 12, and one ends of OIS biasing members 50 are connected to this exposed portions. Power supply to first OIS driving unit 30X is performed via interconnection 17A, and power supply to AF driving unit 14 is performed via interconnection 17B.

Second stage 13 as seen in plan view in the optical-axis direction is a member having a substantially rectangular shape, and is formed of, for example, a liquid crystal polymer. Inner peripheral surface 131 of second stage 13 is formed correspondingly to the external shape of AF movable part 11. Portions of second stage 13 corresponding to first OIS driving unit 30X and second OIS driving unit 30Y (the outer surfaces of the sidewalls along the second side and the third side) are formed to be recessed radially inward as in first stage 12.

Second stage 13 includes, at the lower surface, Y-direction reference ball holding portions 134A to 134C for housing Y-direction reference balls 41A to 41C (see FIGS. 16A and 16B). Y-direction reference ball holding portions 134A to 134C are formed to be recessed in the shape of a rectangle extending in the Y-direction. Y-direction reference ball holding portions 134A to 134C face Y-direction reference ball holding portions 217A to 217C of base 21 in the Z-direction. Y-direction reference ball holding portions 134A and 134B are formed substantially in a V-shape (tapered shape) in a section such that the groove width tapers toward the bottom side, and Y-direction reference ball holding portion 134C is formed substantially in a U-shape.

In addition, second stage 13 includes, at the upper surface, X-direction reference ball holding portions 133A to 133C for holding X-direction reference balls 42A to 42C (see FIGS. 15A to 15C). X-direction reference ball holding portions 133A to 133C are formed to be recessed in a rectangular shape extending in the X-direction. X-direction reference ball holding portions 133A to 133C face X-direction reference ball holding portions 123A to 123C of first stage 12 in the Z-direction. X-direction reference ball holding portions 133A to 133C are formed substantially in a V-shape (tapered shape) in a section such that the groove width tapers toward the bottom side. In the present embodiment, X-direction reference ball holding portions 133A and 133B are disposed in the side (second side) where first OIS driving unit 30X of second stage 13 is disposed, and X-direction reference ball holding portion 133C is disposed in the side (first side) where AF driving unit 14 is disposed. First stage 12 is supported at three points by X-direction reference balls 42A to 42C.

Y-direction reference balls 41A to 41C constituting OIS supporting part 40 are held at multiple contact points between Y-direction reference ball holding portions 217A to 217C of base 21 and Y-direction reference ball holding portions 134A to 134C of second stage 13. Therefore, Y-direction reference balls 41A to 41C roll stably in the Y-direction.

Further, X-direction reference balls 42A to 42C are held at multiple contact points between X-direction reference ball holding portions 133A to 133C of second stage 13 and X-direction reference ball holding portions 123A to 123C of first stage 12. Therefore, X-direction reference balls 42A to 42C roll stably in the X-direction.

AF supporting part 15 is a portion for supporting AF movable part 11 with respect to first stage 12 (AF fixing part). As illustrated in FIGS. 13A to 13C and 14A to 14C, AF supporting part 15 is composed of first Z-direction reference balls 15A, second Z-direction reference balls 15B, first pressurization balls 15C, and second pressurization balls 15D. In the present embodiment, each set of first Z-direction reference balls 15A, second Z-direction reference balls 15B, first pressurization balls 15C, and second pressurization balls 15D is composed of a plurality of balls (three balls in the present embodiment) disposed side by side in the Z-direction.

First Z-direction reference balls 15A are rollably interposed between first Z-direction reference ball holding portions 112a and 122a of AF movable part 11 and first stage 12. Second Z-direction reference balls 15B are rollably interposed between second Z-direction reference ball holding portions 112b and 122b of AF movable part 11 and first stage 12. First pressurization balls 15C are rollably interposed between first pressurization ball holding portions 112c and 122c of AF movable part 11 and first stage 12. Second pressurization balls 15D are rollably interposed between second pressurization ball holding portions 112d and 122d of AF movable part 11 and first stage 12.

At least upper and lower two balls of first Z-direction reference balls 15A, second Z-direction reference balls 15B, first pressurization balls 15C, and second pressurization balls 15D only need to be held between AF movable part 11 and first stage 12. That is, the intermediate balls are provided to secure a spacing distance between the two upper and lower balls, and may have a smaller diameter than the two upper and lower balls.

Figure 20:
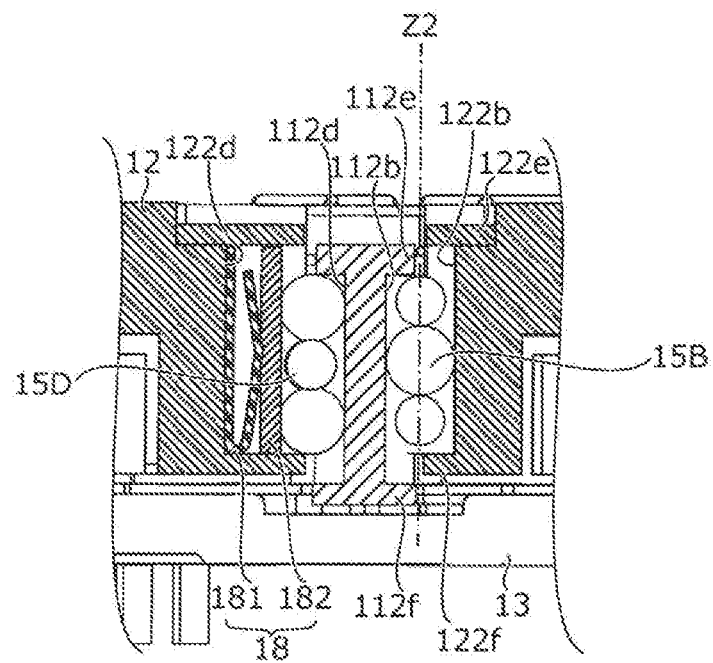
FIG. 20 is a diagram illustrating one example of second Z-direction reference balls.

Further, as illustrated in FIG. 20, in second Z-direction reference balls 15B, the intermediate ball may have a larger diameter than the upper and lower two balls. In this case, two large-diameter balls of first Z-direction reference balls 15A and one large-diameter ball of second Z-direction reference balls 15B come into contact with AF movable part 11 and function as AF supporting part 15. Therefore, since AF movable part 11 is supported at three points by these three balls, AF movable part 11 is held in a more stable attitude.

As illustrated in FIG. 13A, biasing part 18 for biasing AF movable part 11 is disposed between first pressurization balls 15C and first pressurization ball holding portion 122c of first stage 12. Similarly, as illustrated in FIG. 14A, biasing part 18 for biasing AF movable part 11 is disposed between second pressurization balls 15D and second pressurization ball holding portion 122d of first stage 12. AF movable part 11 is supported by first stage 12 in a biased state via first Z-direction reference balls 15A, second Z-direction reference balls 15B, first pressurization balls 15C, and second pressurization balls 15D, and is held in a stable attitude.

Biasing part 18 includes leaf spring 181 (biasing member) formed, for example, from a metal material and spacer 182 (interference member) formed of a ceramic material having a small coefficient of friction. Leaf spring 181 is disposed on the first stage 12 side, and spacer 182 is disposed on the AF movable part 11 side. By interposing ceramic spacer 182 between leaf spring 181 and first pressurization balls 15C or second pressurization balls 15D, the balls can be smoothly rolled and durability is also improved. The material of spacer 182 is not limited to a ceramic material having a small coefficient of friction as long as the spacer allows the balls to roll smoothly, and may be a material having an appropriate coefficient of friction such as a copper alloy or stainless steel, for example.

AF driving unit 14 is an actuator that move AF movable part 11 in the Z-direction. Like OIS driving units 30, AF driving unit 14 is composed of an ultrasonic motor. AF driving unit 14 is fixed to AF motor fixing portion 125 of first stage 12 such that arm portions 141b extend in the Z-direction.

Figure 11A:
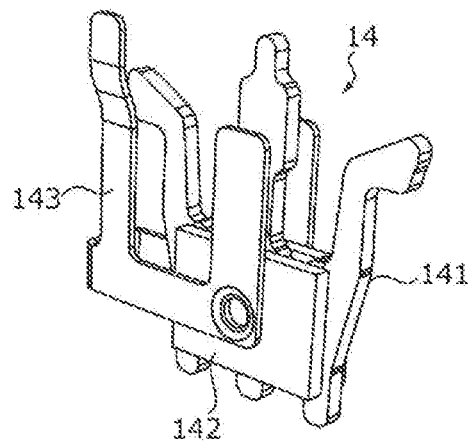
FIGS. 11A and 11B are perspective views of an AF driving unit.
Figure 11B:
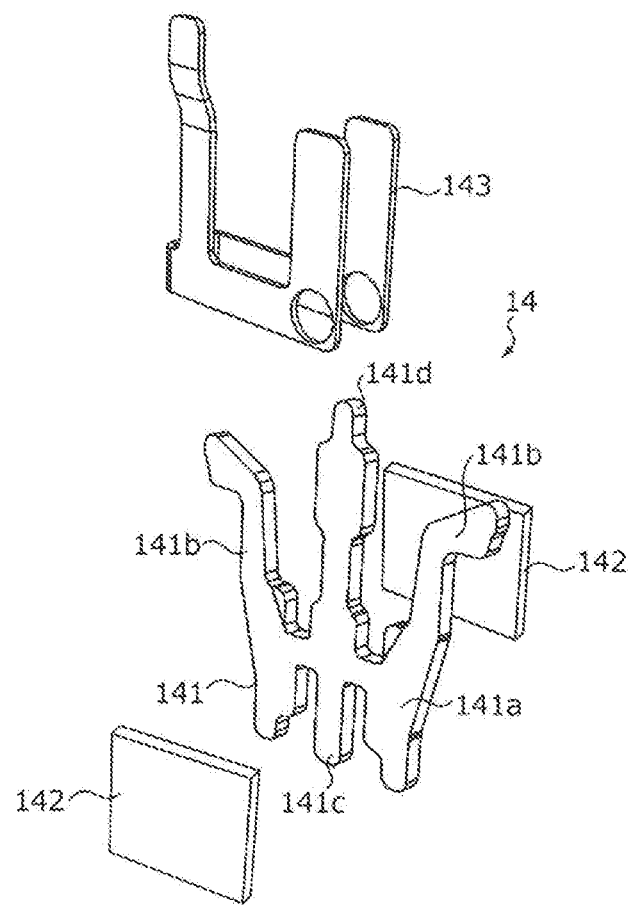

The configuration of AF driving unit 14 is illustrated in FIGS. 11A and 11B. FIG. 11A illustrates AF driving unit 14 whose members are assembled, and FIG. 11B illustrates AF driving unit 14 whose members are disassembled. The configuration of AF driving unit 14 is substantially the same as that of OIS driving units 30.

As illustrated in FIGS. 11A and 11B, AF driving unit 14 includes AF resonant portion 141, AF piezoelectric elements 142, AF electrode 143, and AF power transmission part 144. The driving force of AF driving unit 14 is transmitted to AF movable part 11 via AF power transmission part 144. That is, in AF driving unit 14, AF resonant portion 141 is an active element, and AF power transmission part 144 is a passive element.

AF piezoelectric elements 142 are, for example, plate-shaped elements formed of a ceramic material, and generate a vibration under high-frequency voltage application. Two AF piezoelectric elements 142 are disposed to sandwich body portion 141a of AF resonant portion 141.

AF electrode 143 holds AF resonant portion 141 and AF piezoelectric elements 142 in between, and applies a voltage to AF piezoelectric elements 142.

AF resonant portion 141 is formed of a conductive material and resonates with the vibration of AF piezoelectric elements 142 to convert the vibrational motion into a linear motion. AF resonant portion 141 is formed, for example, by laser processing, etching processing, press working, or the like of a metal plate. In the present embodiment, AF resonant portion 141 includes substantially rectangular body portion 141a sandwiched between AF piezoelectric elements 142, two arm portions 141b extending in the Z-direction from body portion 141a, energization portion 141c extending in the Z-direction from the central portion of body portion 141a and electrically connected to the power supply path (interconnections 17B (upper fixing plate) of first stage 12), and stage fixing portion 141d extending from the central portion of body portion 141a toward the opposite side of energization portion 141c. Two arm portions 141b has symmetrical shapes, and symmetrically deform in resonance with the vibration of AF piezoelectric elements 142. AF driving unit 14 is disposed such that two arm portions 141b extend in the Z-direction and sandwich AF power transmission part 144 at the free end portions.

AF piezoelectric elements 142 are bonded to body portion 141a of AF resonant portion 141 in the thickness direction and are held in between by AF electrode 143, so that these are electrically connected to one another. When energization portion 141c of AF resonant portion 141 and AF electrode 143 are connected to interconnection 17B of first stage 12, a voltage is applied to AF piezoelectric elements 142 and a vibration is thus generated.

Like OIS resonant portion 31, AF resonant portion 141 has at least two resonant frequencies, and deforms in behaviors different between the resonant frequencies. In other words, the entire shape of AF resonant portion 141 is set such that AF resonant portion 141 deforms in behaviors different between the two resonant frequencies.

In optical-element driving device 1, when a voltage is applied to AF driving unit 14, AF piezoelectric elements 142 vibrate, and AF resonant portion 141 deforms in a behavior corresponding to the frequency. The driving force of AF driving unit 14 causes sliding of AF power transmission part 144 in the Z-direction. Accordingly, AF movable part 11 moves in the Z-direction, and focusing is performed. Since AF supporting part 15 is composed of balls, AF movable part 11 can move smoothly in the Z-direction. Moreover, AF driving unit 14 and AF power transmission part 144 are only in contact with each other in a biased state; hence, it is possible to lengthen the movement stroke of AF movable part 11 easily only by increasing a contact portion in the Z-direction without preventing height reduction for optical-element driving device 1.

In optical-element driving device 1, when a voltage is applied to OIS driving unit 30, OIS piezoelectric elements 32 vibrate, and OIS resonant portion 31 deforms in a behavior corresponding to the frequency. The driving force of OIS driving unit 30 causes sliding of OIS power transmission part 34 in the X- or Y-direction. Accordingly, OIS movable part 10 moves in the X- or Y-direction, and shake correction is performed. Since OIS supporting part 40 is composed of balls, OIS movable part 10 can move smoothly in the X- or Y-direction.

Specifically, when first OIS driving unit 30X is driven and OIS power transmission part 34 moves in the X-direction, power is transmitted to second stage 13 from first stage 12 in which first OIS driving unit 30X is disposed. At this time, balls 41 sandwiched between second stage 13 and base 21 are incapable of rolling in the X-direction, and the position of second stage 13 with respect to base 21 in the X-direction is maintained. On the other hand, balls 42 sandwiched between first stage 12 and second stage 13 are capable of rolling in the X-direction, first stage 12 moves with respect to second stage 13 in the X-direction. That is, second stage 13 serves as a component of OIS fixing part 20, and first stage 12 serves as components of OIS movable part 10.

Further, when second OIS driving unit 30Y is driven and OIS power transmission part 34 moves in the Y-direction, power is transmitted to second stage 13 from base 21 where second OIS driving unit 30Y is disposed. At this time, balls 42 sandwiched between first stage 12 and second stage 13 are incapable of rolling in the Y-direction, and the position of first stage 12 with respect to the second stage in the Y-direction is maintained. On the other hand, balls 41 sandwiched between second stage 13 and base 21 are capable of rolling in the Y-direction, second stage 13 moves with respect to base 21 in the Y-direction. First stage 12 also moves in the Y-direction following second stage 13. That is, base 21 serves as a component of OIS fixing part 20, and the AF unit including first stage 12 and second stage 13 serves as a component of OIS movable part 10.

As described above, OIS movable part 10 sways in the XY plane, and shake correction is performed. Specifically, an energization voltage to OIS driving units 30X and 30Y is controlled based on a detection signal indicative of an angular shake from a shake detection part (for example, a gyro sensor (not illustrated)) such that the angular shake of camera module A is canceled. In this case, it is possible to accurately control the translational movement of OIS movable part 10 by feeding back the detection result of the XY position detecting part composed of magnets 16X and 16Y and magnetic sensors 25X and 25Y.

Figure 12:
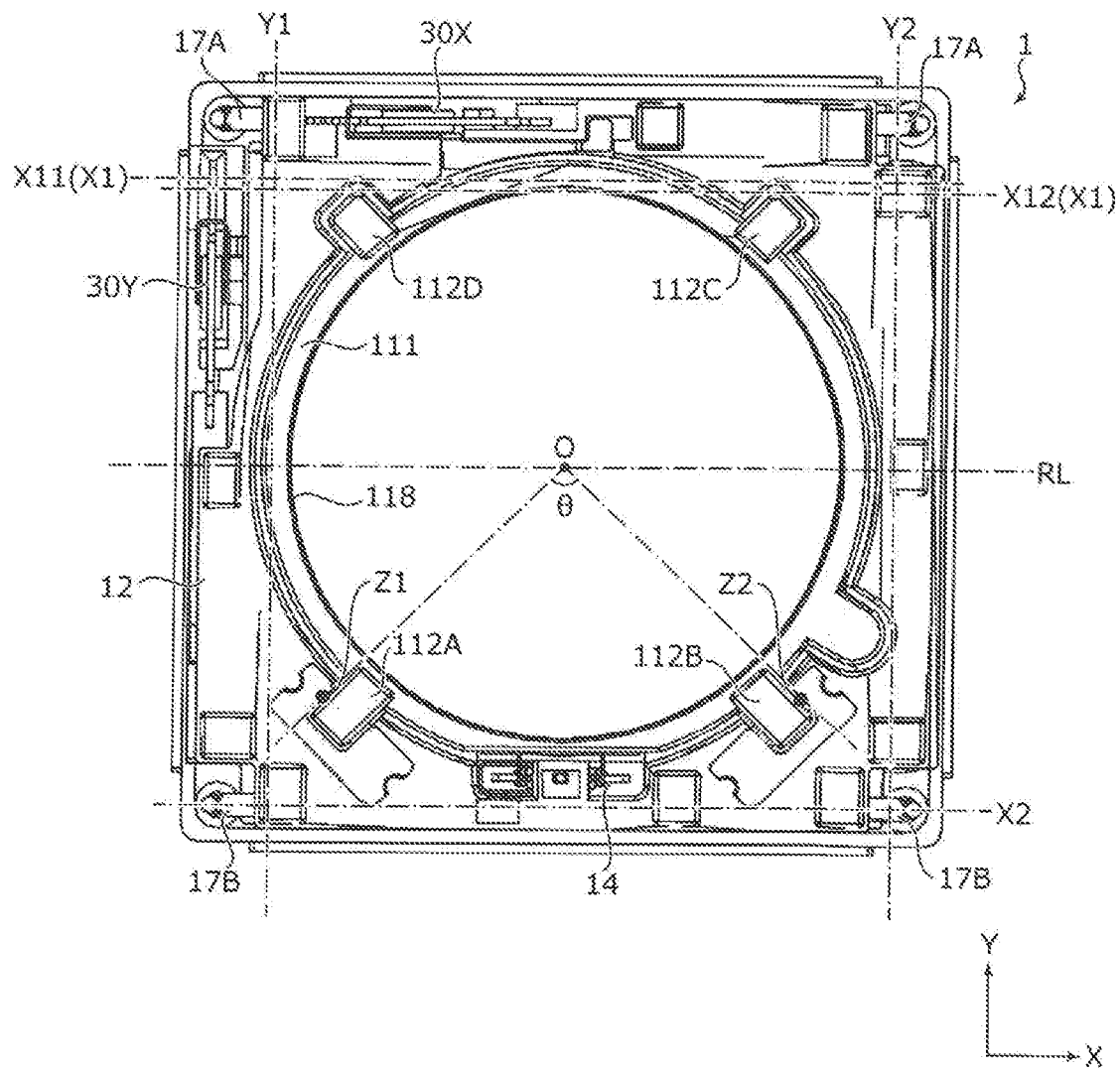
FIG. 12 is a diagram illustrating a reference axis for movement of the AF movable part and the OIS movable part.

FIG. 12 is a diagram illustrating a reference axis for movement of the AF movable part and the OIS movable part. FIG. 12 is a plan view of optical-element driving device 1 as seen from the light reception side in the optical-axis direction and from which cover 24 is removed.

As illustrated in FIG. 12, in optical-element driving device 1, AF movable part 11 moves along first Z-direction reference axis Z1 and second Z-direction reference axis Z2. First Z-direction reference axis Z1 is a rolling axis of first Z-direction reference balls 15A, and second Z-direction reference axis Z2 is a rolling axis of second Z-direction reference balls 15B.

First Z-direction reference axis Z1 is illustrated in FIGS. 13A and 13B, and second Z-direction reference axis Z2 is illustrated in FIGS. 14A and 14B. FIGS. 13A and 13B are a longitudinal sectional view and a cross-sectional view of a portion of AF movable part 11 around protruding portion 112A in which first Z-direction reference balls 15A are disposed, and FIGS. 14A and 14B are a longitudinal sectional view and a cross sectional view of a portion of AF movable part 11 around protruding portion 112B in which second Z-direction reference balls 15B are disposed. FIGS. 13B and 14B illustrate the structure in a simplified form.

First Z-direction reference balls 15A are sandwiched by first Z-direction reference ball holding portions 112a and 122a of the AF movable part 11 and first stage 12, and are restricted from moving in the direction perpendicular to the optical axis (the rotation of AF movable part 11) as illustrated in FIGS. 13A and 13B. As a result, AF movable part 11 can be moved in a stable manner in the optical-axis direction.

Meanwhile, second Z-direction reference balls 15B are sandwiched by second Z-direction reference ball holding portions 112b and 122b of AF movable part 11 and first stage 12, and are allowed to move in the direction perpendicular to the optical axis as illustrated in FIGS. 14A and 14B. With this configuration, it is possible to absorb the dimensional tolerances of AF movable part 11 and first stage 12, and to improve the stability during movement of AF movable part 11.

In the present embodiment, first Z-direction reference axis Z1 and second Z-direction reference axis Z2 are disposed on the side of AF driving unit 14, which is a driving force generating source, with reference to center O of circular opening 118 in AF movable part 11, and AF driving unit 14 is positioned between first Z-direction reference axis Z1 (first Z-direction reference balls 15A) and second Z-direction reference axis Z2 (second Z-direction reference balls 15B) in the circumferential direction. That is, AF supporting part 15 and AF driving unit 14 are disposed on the same-half side of optical-element driving device 1 as seen in plan view in the optical-axis direction. The "same-half side" means the same side with respect to reference line RL serving as a boundary that passes through center O of opening 118 in AF movable part 11.

When AF driving unit 14 is close to first Z-direction reference axis Z1 and second Z-direction reference axis Z2, that is, when AF driving unit 14 is close to AF supporting part 15, the rotational moment with respect to the supporting position is suppressed, and thus the moving operation of AF movable part 11 is stabilized. For example, even when some kind of frictional resistance occurs, AF movable part 11 is less likely to be inclined, and can be moved straight in the optical-axis direction.

It is preferable that angle θ formed by first Z-direction reference axis Z1, second Z-direction reference axis Z2, and center O of opening 118 in AF movable part 11 be 45° to 180°. Further, it is preferable that first Z-direction reference axis Z1 and second Z-direction reference axis Z2 be disposed symmetrically with respect to AF driving unit 14. With such a configuration, the stability of the moving operation of AF movable part 11 can be further improved.

Further, in the present embodiment, first Z-direction reference balls 15A and second Z-direction reference balls 15B (hereinafter referred to as "Z-direction reference balls 15A and 15B") roll without slippage being caused as AF movable part 11 moves.

That is, image-formation-side stopper 112f of AF movable part 11 is located on the image formation side of image-formation-side stopper 122f of first stage 12 in the optical-axis direction in the reference state, and is spaced apart from the lower end of Z-direction reference balls 15A and 15B (hereinafter referred to as the "ball lower end"). The separation distance between image-formation-side stopper 112f of AF movable part 11 and the ball lower end is set to be larger than the maximum value of the movement stroke of AF movable part 11.

Light-reception-side stopper 122e of first stage 12 is spaced apart from the upper end of Z-direction reference balls 15A and 15B (hereinafter referred to as "ball upper end"). The separation distance between light-reception-side stopper 122e of first stage 12 and the ball upper end is set to be larger than the maximum value of the movement displacement of Z-direction reference balls 15A and 15B (smaller than the maximum movement stroke of AF movable part 11) accompanying the movement of AF movable part 11.

Z-direction reference balls 15A and 15B are sandwiched between, for example, light-reception-side stopper 112e of AF movable part 11 and image-formation-side stopper 122f of first stage 12 in the reference state.

Thus, when AF movable part 11 moves, image-formation-side stopper 112f of AF movable part 11 does not reach the ball lower end. Accordingly, first Z-direction reference balls 15A and second Z-direction reference balls 15B roll without slippage being caused. The friction between, on one hand, AF movable part 11 and first stage 12 and, on the other hand, Z-direction reference balls 15A and 15B is not the sliding friction but the rolling friction, and AF movable part 11 moves smoothly. Thus, the stable operation of AF movable part 11 can be further improved. Further, by disposing light-reception-side stoppers 112e and 122e and imageformation-side stoppers 112*f* and 122*f*, it is possible to suppress intrusion of foreign matter such as dust, and to prevent rolling of Z-direction reference balls 15A and 15B from being hindered by the foreign matter.

Figure 18A:
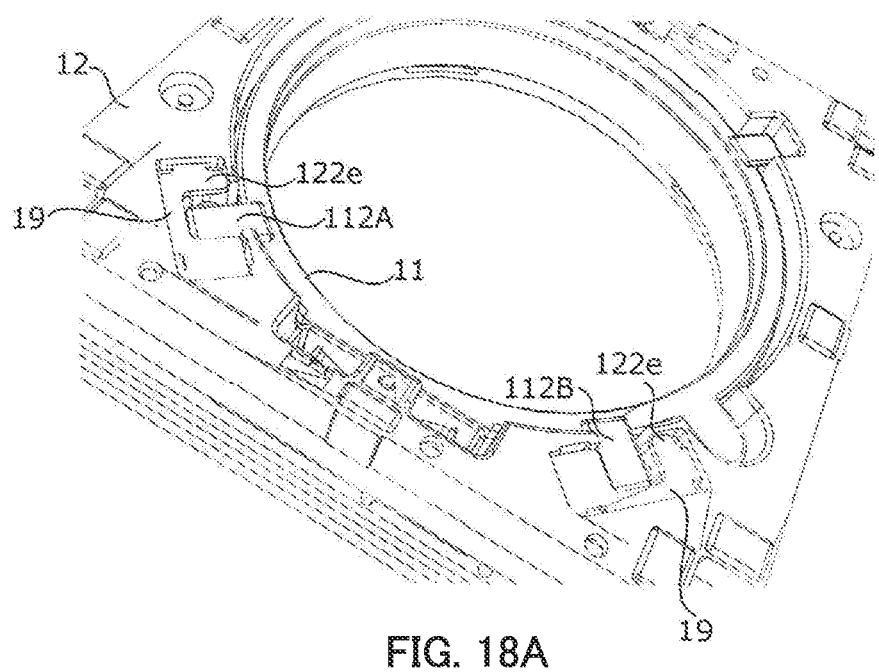
FIGS. 18A and 18B are diagrams illustrating one example of a closed state of a ball housing.
Figure 18B:
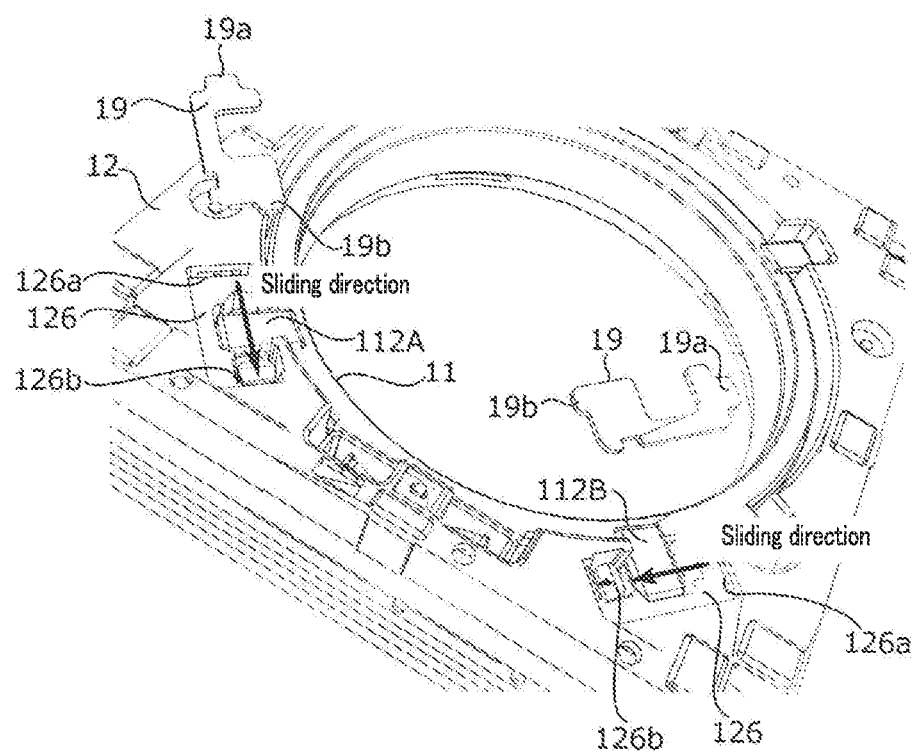

Light-reception-side stopper 122*e* of first stage 12 is formed by, for example, slide cover 19 (see FIGS. 18A and 18B). FIG. 18A illustrates a state in which slide cover 19 is attached, and FIG. 18B illustrates a state in which slide cover 19 is removed.

As illustrated in FIG. 18B, slide cover 19 has protruding pieces 19*a* and 19*b* having different protrusion lengths on opposite sides in a sliding direction. Meanwhile, in first stage 12, the ball housings (whose reference symbol is omitted) that house first Z-direction reference balls 15A, first pressurization balls 15C, second Z-direction reference balls 15B, and second pressurization balls 15D are open on the light reception side in the optical-axis direction, and recessed portion 126 is disposed at an open end portion.

After slide cover 19 is disposed such that protruding piece 19*a* having a longer protrusion length is inserted in insertion hole 126*a* formed in one end of recessed portion 123 in the sliding direction, slide cover 19 is slid such that protruding piece 19*b* having a shorter protrusion length is inserted into insertion hole 126*b* formed at the other end of recessed portion 126. Protruding pieces 19*a* and 19*b* of slide cover 19 are engaged with insertion holes 126*a* and 126*b* of recessed portion 126, and slide cover 19 closes the light reception side of the ball housing in the optical-axis direction. Although not illustrated in the figures, for example, a roughened structure may be formed on contact surfaces of recessed portion 126 and slide cover 19 such that the slide cover is non-slidably locked at a predetermined position.

As described above, by forming light-reception-side stopper 122*e* of first stage 12 using slide cover 19, AF movable part 11 can be inserted from the light reception side of first stage 12 in the optical-axis direction in a state in which first and second Z-direction reference balls 15A and 15B and first and second pressurization balls 15C and 15D are disposed on protruding portions 112A and 112B of AF movable part 11. Thus, the workability at the time of assembly is improved.

As illustrated in FIG. 12, in optical-element driving device 1, OIS movable part 10 (only the AF unit) moves along first X-direction reference axis X1 and second X-direction reference axis X2. First X-direction reference axis X1 is a rolling axis of X-direction reference balls 42A and 42B, and second X-direction reference axis X2 is a rolling axis of X-direction reference ball 42C. First X-direction reference axis X1 may be a plurality of axes (first X-direction reference axes X11 and X12) as in the present embodiment, or may be a single axis. The same applies to second X-direction reference axis X2.

X-direction reference axes X1 and X2 are illustrated in FIGS. 15A to 15C. FIG. 15A is a plan view of optical-element driving device 1 as seen from the light reception side in the optical-axis direction and from which AF movable part 11 and first stage 12 are removed. FIG. 15B illustrates a longitudinal section of X-direction reference ball holding portions 133A and 133B taken along the Y-direction, and FIG. 15C is a longitudinal section of X-direction reference ball holding portion 133C taken along the Y-direction. In FIGS. 15C and 15B, the structure is illustrated in a simplified form.

As illustrated in FIG. 15B, X-direction reference balls 42A and 42B are sandwiched between X-direction reference ball holding portions 133A and 133B of second stage 13 and X-direction reference ball holding portions 123A and 123B of first stage 12, and are restricted from moving in the Y-direction. As a result, OIS movable part 10 (AF movable part 11 and first stage 12) can be moved in the X-direction in a stable behavior.

Meanwhile, as illustrated in FIG. 15C, X-direction reference ball 42C is allowed to move in the Y-direction by X-direction reference ball holding portions 133C and 123C of second stage 13 and first stage 12. With this configuration, it is possible to absorb the dimensional tolerances of second stage 13 and first stage 12, and to improve the stability during movement of OIS movable part 10 in the X-direction.

Pressure is applied to X-direction reference balls 42A to 42C in the Z-direction by OIS biasing members 50.

In the present embodiment, first X-direction reference axes X1 (X11, X12) are provided on the side of first OIS driving unit 30X, which is a driving force generating source, with reference to center O of circular opening 118 in AF movable part 11. As a result, the moment for causing rotation around the optical-axis direction is suppressed. Thus, the movement of OIS movable part 10 in the X-direction is stabilized.

Further, in the present embodiment, OIS movable part 10 (first stage 12) is supported at three points with respect to OIS fixing part 20 (second stage 13) by X-direction reference balls 42A to 42C disposed to surround center O of circular opening 118 in AF movable part 11. As a result, even if warpage or the like is caused in a part, first stage 12 reliably makes contact with X-direction reference balls 42A to 42C. Thus, the attitude of first stage 12 is stabilized.

As illustrated in FIG. 12, in optical-element driving device 1, OIS movable part 10 (the AF unit and second stage 13) moves along first Y-direction reference axis Y1 and second Y-direction reference axis Y2. First Y-direction reference axis Y1 is a rolling axis of Y-direction reference balls 41A and 41B, and second Y-direction reference axis Y2 is a rolling axis of Y-direction reference ball 41C. Note that first Y-direction reference axis Y1 may be a single axis as in the present embodiment, or may be a plurality axes. The same applies to second Y-direction reference axis Y2.

Y-direction reference axes Y1 and Y2 are illustrated in FIGS. 16A to 16C. FIG. 16A is a plan view of optical-element driving device 1 (mainly, base 21) as viewed from the light reception side in the optical-axis direction and from which AF movable part 11, first stage 12, and second stage 13 are removed. FIG. 16B illustrates a longitudinal section along the X-direction of Y-direction reference ball holding portions 217A and 217B, and FIG. 16C illustrates a longitudinal section along the X-direction of Y-direction reference ball holding portion 217C. In FIGS. 16B and 16C, the structure is illustrated in a simplified form.

As illustrated in FIG. 16B, Y-direction reference balls 41A and 41B are sandwiched between Y-direction reference ball holding portions 217A and 217B of base 21 and Y-direction reference ball holding portions 134A and 134B of second stage 13, and are restricted from moving in the X-direction. As a result, OIS movable part 10 (AF movable part 11, first stage 12, and second stage 13) can be moved in the Y-direction in a stabilized behavior.

Meanwhile, as illustrated in FIG. 16C, Y-direction reference ball 41C is allowed to move in the X-direction by Y-direction reference ball holding portions 217C and 134C of base 21 and second stage 13. With this configuration, it is possible to absorb the dimensional tolerances of base 21 and second stage 13, and to improve the stability during movement of OIS movable part 10 in the Y-direction.

Pressure is applied to X-direction reference balls 42A to 42C in the Z-direction by OIS biasing members 50.

In the present embodiment, first Y-direction reference axis Y1 is provided on the side of second OIS driving unit 30Y, which is a driving force generating source, with reference to center O of circular opening 118 in AF movable part 11. As a result, the moment for causing rotation around the optical-axis direction is suppressed. Thus, the movement of OIS movable part 10 in the Y-direction is stabilized.

Further, in the present embodiment, OIS movable part 10 (second stage 13) is supported at three points with respect to OIS fixing part 20 (base 21) by Y-direction reference balls 41A to 42C disposed to surround center O of circular opening 118 in AF movable part 11. Thus, even if warpage or the like occurs in a part, second stage 13 reliably makes contact with Y-direction reference balls 41A to 41C. Thus, the attitude of second stage 13 is stabilized.

As is understood, optical-element driving device 1 according to the embodiment includes first stage 12 (first fixing part), AF movable part 11 (first movable part) disposed radially inside of first stage 12, AF supporting part 15 (first supporting part) for supporting AF movable part 11 with respect to first stage 12, AF driving unit 14 (Z-direction driving part) disposed on first stage 12 and configured to move AF movable part 11 with respect to first stage 12 in the optical-axis direction. The optical-element driving device has a rectangular shape in plan view when viewed from the optical-axis direction.

AF driving unit 14 includes an ultrasonic motor that converts a vibrational motion into a linear motion, and is disposed on the first side of a rectangle so as to transmit the linear motion to AF movable part 11.

AF supporting part 15 includes first Z-direction reference balls 15A (first reference balls), second Z-direction reference ball 15B (second reference balls), and leaf spring 181 (first biasing member and second biasing member) that biases AF movable part 11 to first stage 12 via first Z-direction reference balls 15A and second Z-direction reference balls 15B.

AF movable part 11 and first stage 12 include, at the first-side side of center O of circular opening 118 in AF movable part 11, first Z-direction reference ball holding portions 112a and 122a (first reference ball holding portions) and second Z-direction reference ball holding portions 112b and 122b (second reference ball holding portions) that are formed along the optical-axis direction and accommodate first Z-direction reference balls 15A and second Z-direction reference balls 15B, respectively. AF driving unit 14 is positioned between first Z-direction reference balls 15A and second Z-direction reference balls 15B in the circumferential direction.

In optical-element driving device 1, biasing part 18 includes leaf spring 181 (elastic member) that biases AF supporting part 15, and spacer 182 disposed between leaf spring 181 and AF supporting part 15.

Further, in optical-element driving device 1, AF driving unit 14 (Z-direction driving part) extends linearly in a plane orthogonal to the optical-axis direction, and AF supporting part 15 (first supporting part) and AF driving unit 14 are disposed on the same-half side of optical-element driving device 1 as seen in plan view in the optical-axis direction.

Further, optical-element driving device 1 includes: OIS fixing part 20 (second fixing part); OIS movable part 10 (second movable part) that includes first stage 12 (first fixing part), AF movable part 11 (first movable part), and AF supporting part 15 (first supporting part) and that is disposed to be spaced apart from OIS fixing part 20 in the optical-axis direction; and OIS driving unit 30 (XY-direction driving part) that includes an ultrasonic motor that converts a vibration into a linear motion and moves OIS movable part 10 in a direction orthogonal to the optical-axis direction by the linear motion. AF driving unit 14 (Z-direction driving part) is disposed in a region (first linear region) along the first side in a plane orthogonal to the optical-axis direction, and OIS driving unit 30 (XY-direction driving part) is disposed in a region (second linear region) along a second side orthogonal to the first side and a region (third linear region) along a third side parallel to the first side.

Further, optical-element driving device 1 includes sensor board 22 on which magnetic sensors 25X, 25Y, and 25Z (detecting sensors) for detecting the position of AF movable part 11 (first movable part) in the optical-axis direction and the position of OIS movable part 10 (second movable part) in the direction perpendicular to the optical axis are mounted. Sensor board 22 is disposed in a region other than the first to the third linear regions.

According to optical-element driving device 1, since AF driving unit 14 is composed of an ultrasonic motor, it is possible to reduce an influence of external magnetism, and to reduce the size and height.

In addition, arm portions 141b of AF driving unit 14 extend in the optical-axis direction and are sandwiched by AF power transmission part 144, and the driving force of AF driving unit 14 is transmitted to AF movable part 11 to the maximum extent. Thus, the driving force for moving AF movable part 11 can be efficiently obtained. Moreover, by bringing the position of AF driving unit 14 and the position of AF supporting part 15 close to each other, the rotational moment with respect to the supporting position is suppressed. Thus, the moving operation of AF movable part 11 is stabilized. Therefore, the driving performance of optical-element driving device 1 is remarkably improved.

Even when camera modules A having optical-element driving device 1 are disposed close to each other as in smartphone M, no magnetic influence is caused. Thus, the optical-element driving device is extremely suitable for use in a dual camera.

Modification 1

As described in the embodiment, the structure of AF power transmission part 144 (passive element) of AF driving unit 14 can be arbitrarily changed as appropriate. In the embodiment, as illustrated in FIGS. 19A and 19B, AF power transmission part 144 includes leaf springs 144b, and AF resonant portion 141 and AF power transmission part 144 are held in contact with each other by their own biasing function. In this case, biasing loads by leaf springs 144b change with the movement of AF movable part 11 in the optical-axis direction. For example, when AF movable part 11 is displaced toward the image formation side in the optical-axis direction, the biasing loads by leaf springs 144b increase. Conversely, when AF movable part 11 is displaced toward the light reception side in the optical-axis direction, the biasing loads by leaf springs 144b decrease. Therefore, in order to transmit a predetermined power from AF resonant portion 141 to AF power transmission part 144, a device such as that for increasing the rigidity of leaf springs 144b is required. Modification 1 is improved such that the biasing loads of the AF power transmission part with respect to AF resonant portion 141 are constant regardless of the displacement of AF movable part 11.

Figure 21:
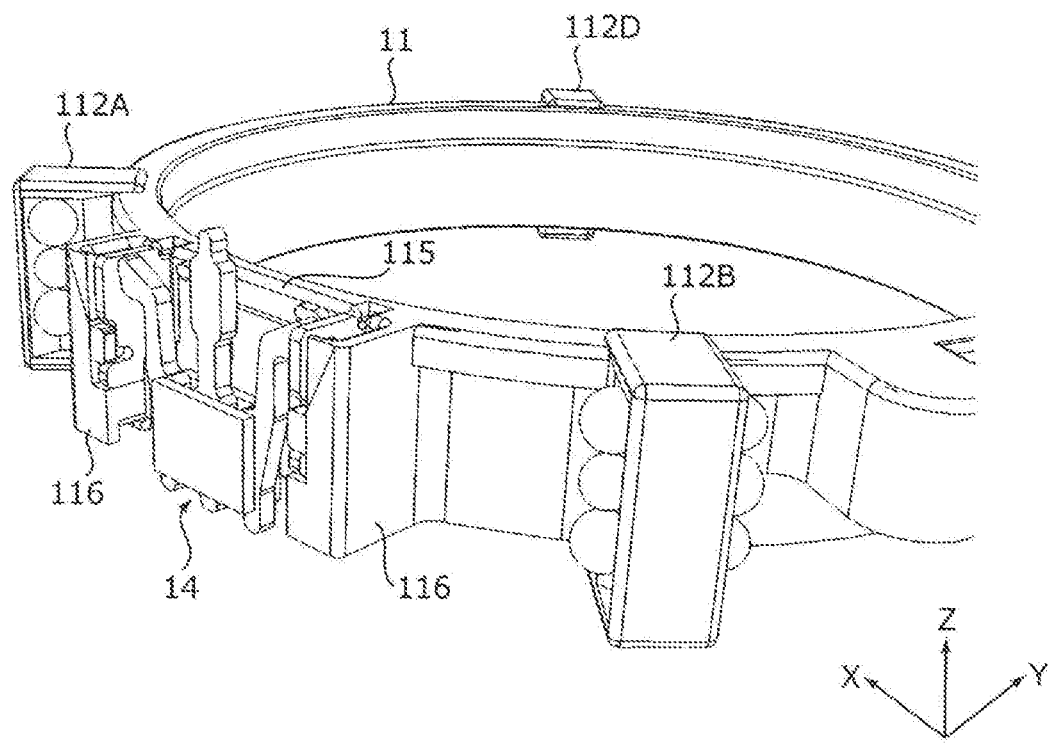
FIG. 21 is a perspective view of an AF driving unit according to Modification 1.
Figure 22:
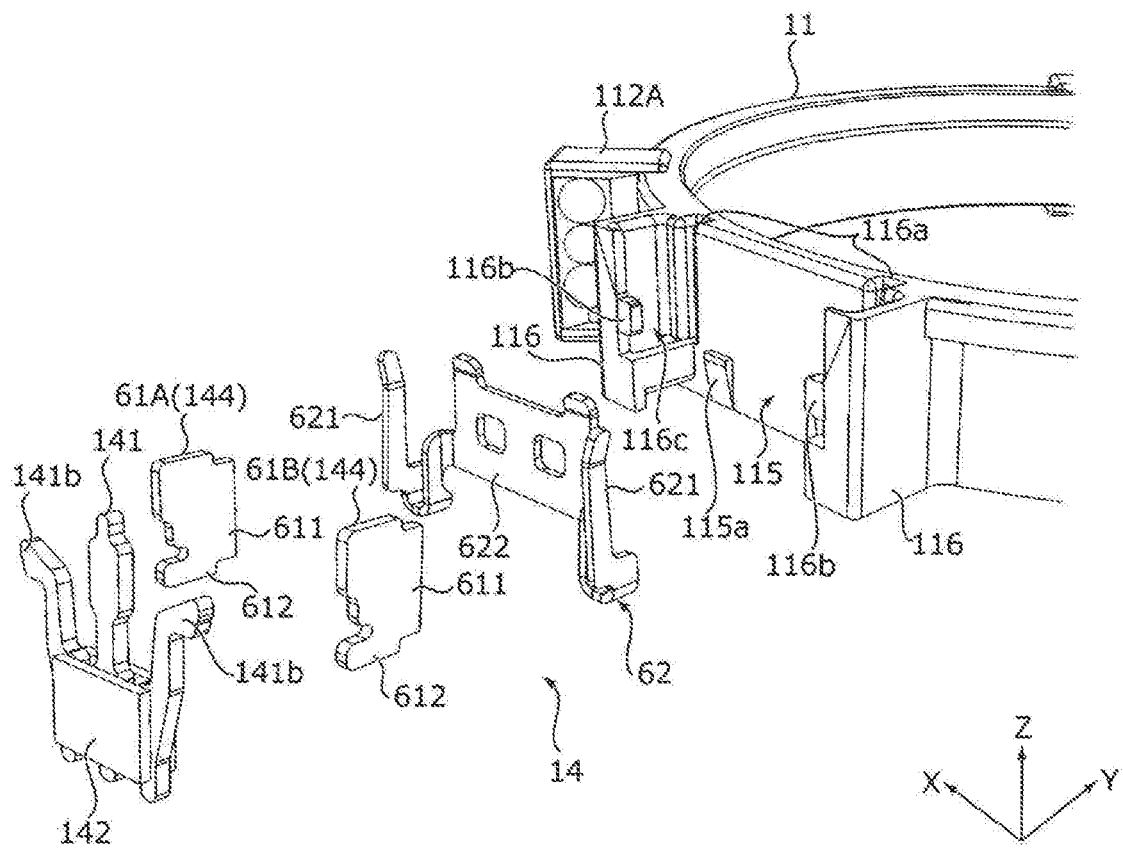
FIG. 22 is an exploded perspective view of the AF driving unit according to Modification 1.
Figure 23A:
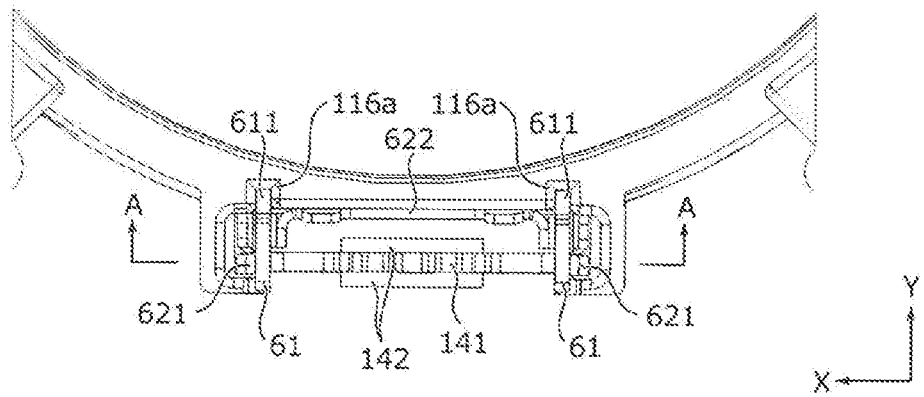
FIG. 23A is a top view of the AF driving unit according to Modification 1.
Figure 23B:
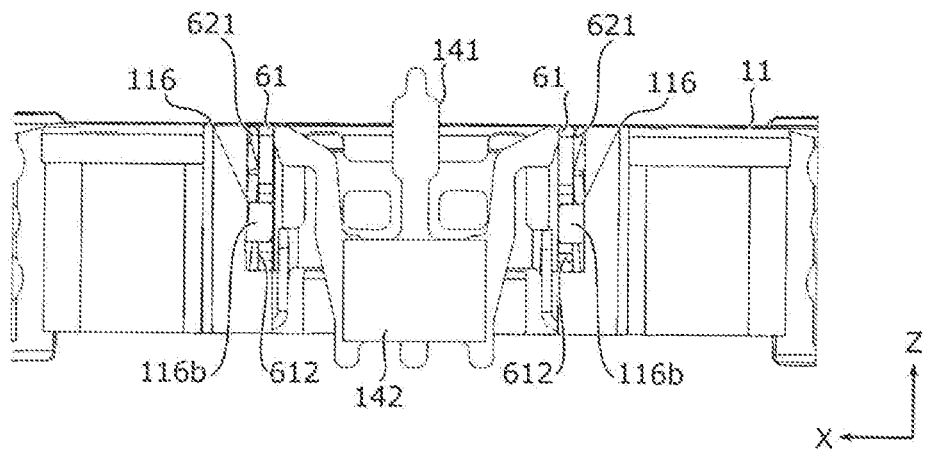
FIG. 23B is a side view of the AF driving unit.
Figure 23C:
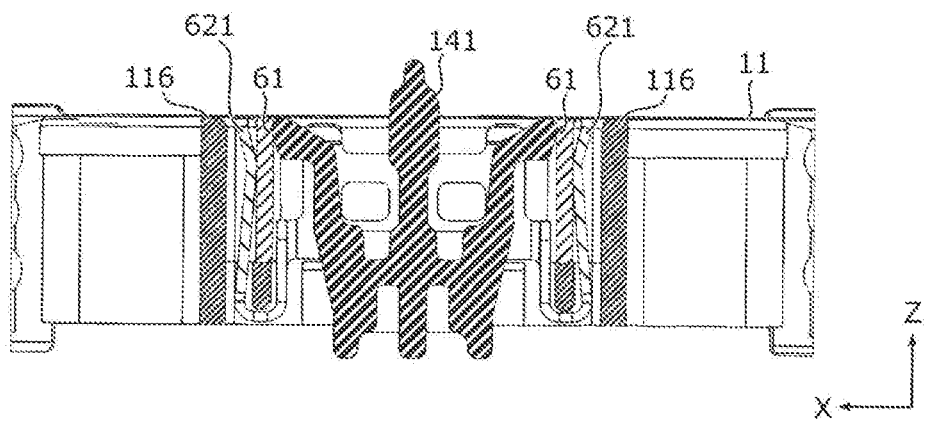
FIG. 23C is a sectional view of the AF driving unit as seen in the direction of arrow A-A in FIG. 23A.

FIGS. 21, 22, and 23A to 23C illustrate the configuration of AF driving unit 14 according to Modification 1. FIG. 21 is a perspective view of AF driving unit 14 according to Modification 1. FIG. 22 is an exploded perspective view of AF driving unit 14 according to Modification 1. FIG. 23A is a top view of AF driving unit 14 according to Modification 1, FIG. 23B is a side view of the AF driving unit, FIG. 23C is a sectional view of the AF driving unit as seen in the direction of arrow A-A in FIG. 23A.

As illustrated in FIG. 21 and the like, AF driving unit 14 according to Modification 1 is disposed in driving-unit housing 115 of AF movable part 11 as in the embodiment. AF movable part 11 is provided with plate housings 116 that bulge radially outward, with driving-unit housing 115 being interposed therebetween.

The configuration of AF driving unit 14 on the active side (such as AF resonant portion 141) is the same as that of the embodiment. Modification 1 differs from the embodiment in that plates 61 are interposed between AF resonant portion 141 and biasing member 62, and the power from AF resonant portion 141 is transmitted to AF movable part 11 via plates 61. That is, in Modification 1, two plates 61 function as AF power transmission part 144 that is a passive element of AF driving unit 14.

Plates 61 are, for example, a hard plate-like member made of a metal material such as titanium copper, nickel copper, or stainless steel. Plates 61 are disposed in AF movable part 11 along the moving direction such that the main surfaces of the plates make contact with arm portions 141b of AF resonant portion 141, and are movable integrally with AF movable part 11. In Modification 1, plates 61 are disposed in plate housings 116 of AF movable part 11 and are physically locked. Specifically, plates 61 are fixed to AF movable part 11, with guide insertion portions 611 being loosely fitted in guide grooves 116a formed in AF movable part 11 and fixation pieces 612 being disposed between the bottom surfaces of recessed portion 116c and locking piece 116b.

Plates 61 only need to be fixed to AF movable part 11 to be capable of following the attachment state (individual difference in attachment position) of AF resonant portion 141. The plates do not have to be bonded, or may be bonded with an elastically deformable soft adhesive (for example, silicone rubber).

Biasing member 62 is a member for biasing plates 61 toward arm portions 141b of AF resonant portion 141, and includes two spring portions 621. Spring portions 621 are configured to press plates 61 against arm portions 141b with the same biasing forces.

In Modification 1, biasing member 62 is formed by, for example, sheet metal processing, and spring portions 621 are formed from leaf springs extending from coupling portion 622. Specifically, the leaf springs of spring portions 621 are formed to extend from a lower portion of coupling portion 622 toward the −side in the Z-direction, to be folded back outward in a hairpin shape, and to be inclined inward with respect to the Z-direction.

Biasing member 62 is fixed to AF movable part 11 by placing coupling portion 622 on spring placement portions 115a disposed on driving-unit housing 115 and disposing spring portions 621 in recessed portions 116c of plate housings 116. Plates 61 are positioned at hairpin portions of biasing member 62, and are biased toward the inside (toward the arm portion 141b side) by spring portions 621. In Modification 1, biasing member 62 is not bonded to AF movable part 11 so as to be capable of following the attachment position of AF driving unit 14. That is, biasing member 62 is movable along an attachment surface of driving-unit housing 115, and is held at a position where the biasing loads of two spring portions 621 are uniform when the biasing member sandwiches AF driving unit 14 (AF resonant portion 141 and plates 61).

Note that the configuration of biasing member 62 is one example and can be changed as appropriate. For example, the configuration of AF power transmission part 144 illustrated in FIG. 19A and the like may be applied. Alternatively, an elastic body such as a coil spring or a hard rubber may be used.

As is understood, in Modification 1, AF driving unit 14 (Z-direction driving part) includes AF piezoelectric elements 142 that generate vibration under application of voltage, AF resonant portion 141 (active element) that resonates with the vibration of AF piezoelectric elements 142 and converts the vibration into a linear motion, AF power transmission part 144 (passive element) that is disposed in AF movable part 11 (first movable part) and moves relatively to AF resonant portion 141 in response to the linear motion of AF resonant portion 141, and biasing member 62 (second biasing part) that is disposed on AF movable part 11 and biases AF power transmission part 144 toward AF resonant portion 141, in which AF power transmission part 144 is composed of plates 61 making contact with AF resonant portion 141. Specifically, AF power transmission part 144 makes contact with two arm portions 141b of AF resonant portion 141, receives the power of arm portions 141b, and moves relatively to AF resonant portion 141. Biasing member 62 biases AF power transmission part 144 toward arm portions 141b. AF power transmission part 144 is composed of two plates 61 that are disposed in AF movable part 11 along the moving direction, and make contact respectively with arm portions 141b, and plates 61 are biased respectively toward arm portions 141b by biasing member 62.

Accordingly, biasing member 62 presses plates 61 against arm portions 141b with the same biasing forces. Thus, even when AF movable part 11 moves in the optical-axis direction, a biased state (biasing loads) between arm portions 141b of AF resonant portion 141 as the active element and plates 61 as the passive element is not changed. Therefore, the power from AF resonant portion 141 can be stably transmitted to AF movable part 11 via plates 61 as compared with the case where AF power transmission part 144 also functions as a spring as in the embodiment.

Further, in the case where AF power transmission part 144 also functions as a spring as in the embodiment, it is difficult to employ a material having high rigidity. Unlike this, in Modification 1, it is easy to increase the rigidity of plates 61. Further, as compared with the embodiment, the power transmission path from AF resonant portion 141 to AF movable part 11 is short. Therefore, the power transmission efficiency of power transmission from AF resonant portion 141 to AF movable part 11 can be improved.

Further, since plates 61 have a flat surface, any surface treatment can be appropriately performed. For example, when a coating layer such as diamond-like carbon (DLC) or ceramic is formed on the surface, the abrasion resistance is remarkably improved.

In addition, in AF driving unit 14 of Modification 1, AF power transmission part 144 (passive element) includes two plates 61. Biasing member 62 includes two spring portions 621 for biasing respective plates 61. AF resonant portion 141 (active element) and plates 61 (passive element) are sandwiched by spring portions 621.

As a result, AF driving unit 14 is held in a state in which the biasing forces of two spring portions 621 are balanced. Thus, uniform biasing forces can be easily applied to left and right plates 61.

Further, biasing member 62 is formed from a single member, and is disposed on AF movable part 11 to be capable of following the attached state of AF driving unit 14.

As a result, alignment is easily performed in accordance with the attached state of AF driving unit 14. Thus, the stability of the operation is further improved.

Figure 24A:
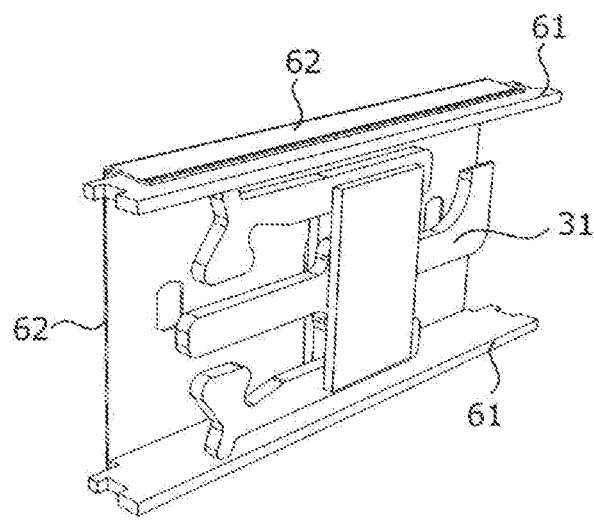
FIGS. 24A and 24B are perspective views of an OIS driving unit according to Modification 1.
Figure 24B:
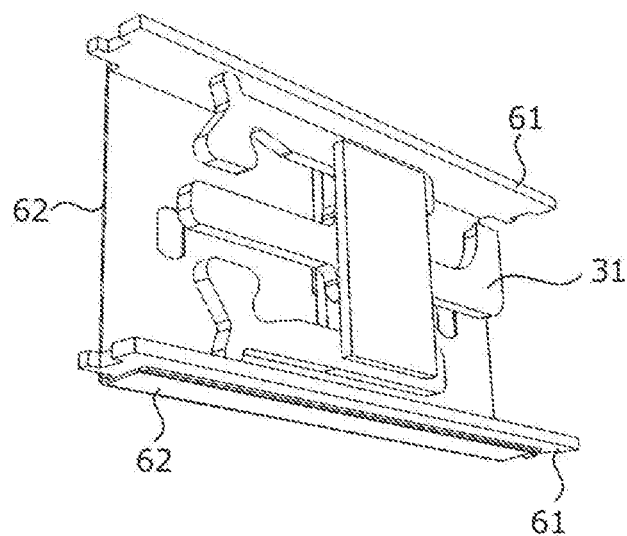

The above-described configuration of AF driving unit 14 can also be applied to OIS driving unit 30 as illustrated in FIGS. 24A and 24B. In FIGS. 24A and 4B, biasing member 62 is composed of a member having a simple U-shaped section. Plates 61 are fixed to second stage 13. That is, by applying the combination of plates 61 and biasing member 62 in place of OIS power transmission part 34 of the embodiment, it is possible to easily cope with the long stroke, and the stability of the operation is improved.

Modification 2

Figure 25:
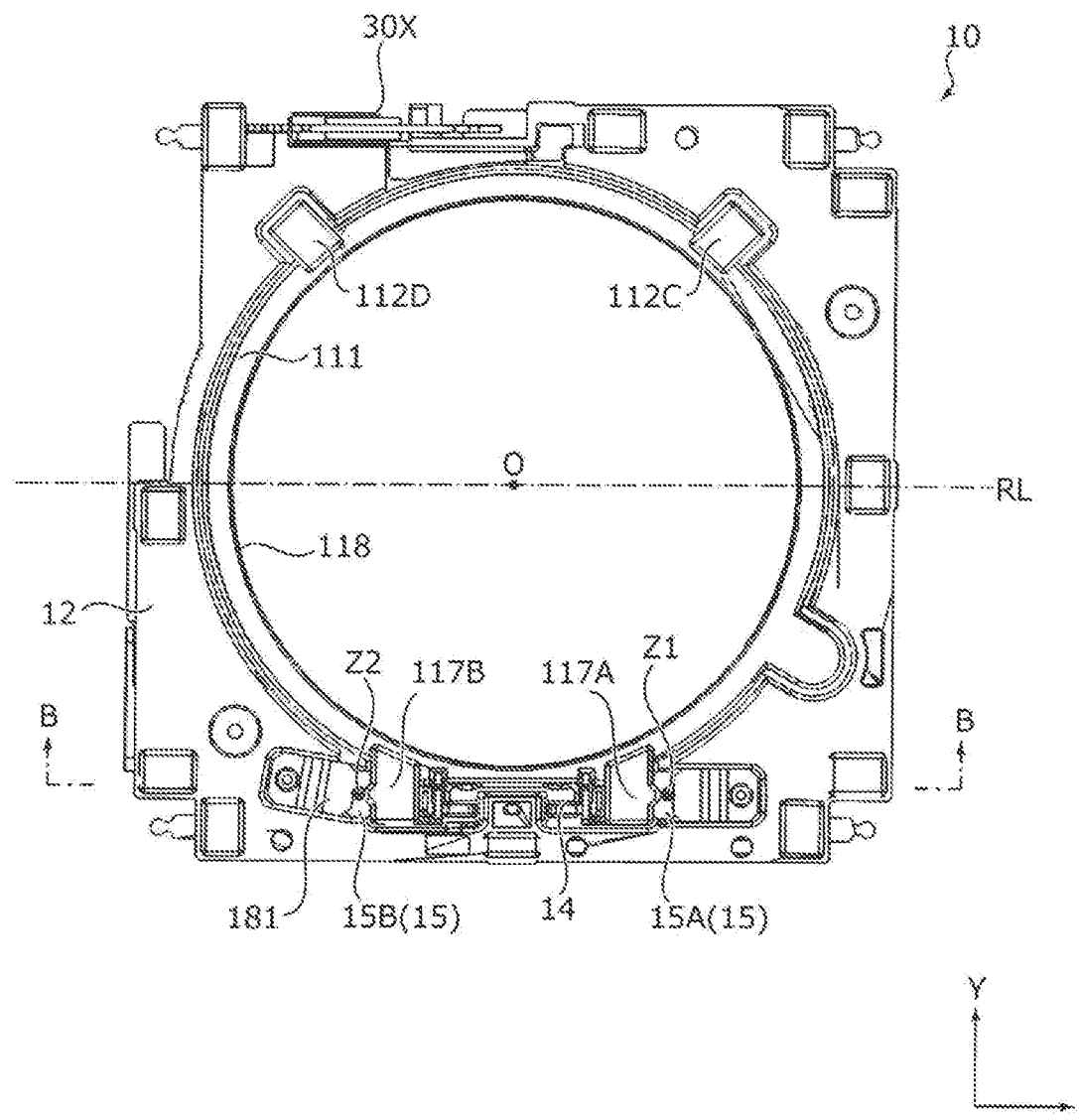
FIG. 25 is a plan view of an OIS movable part according to Modification 2 as viewed from the light reception side in the optical-axis direction.
Figure 26:
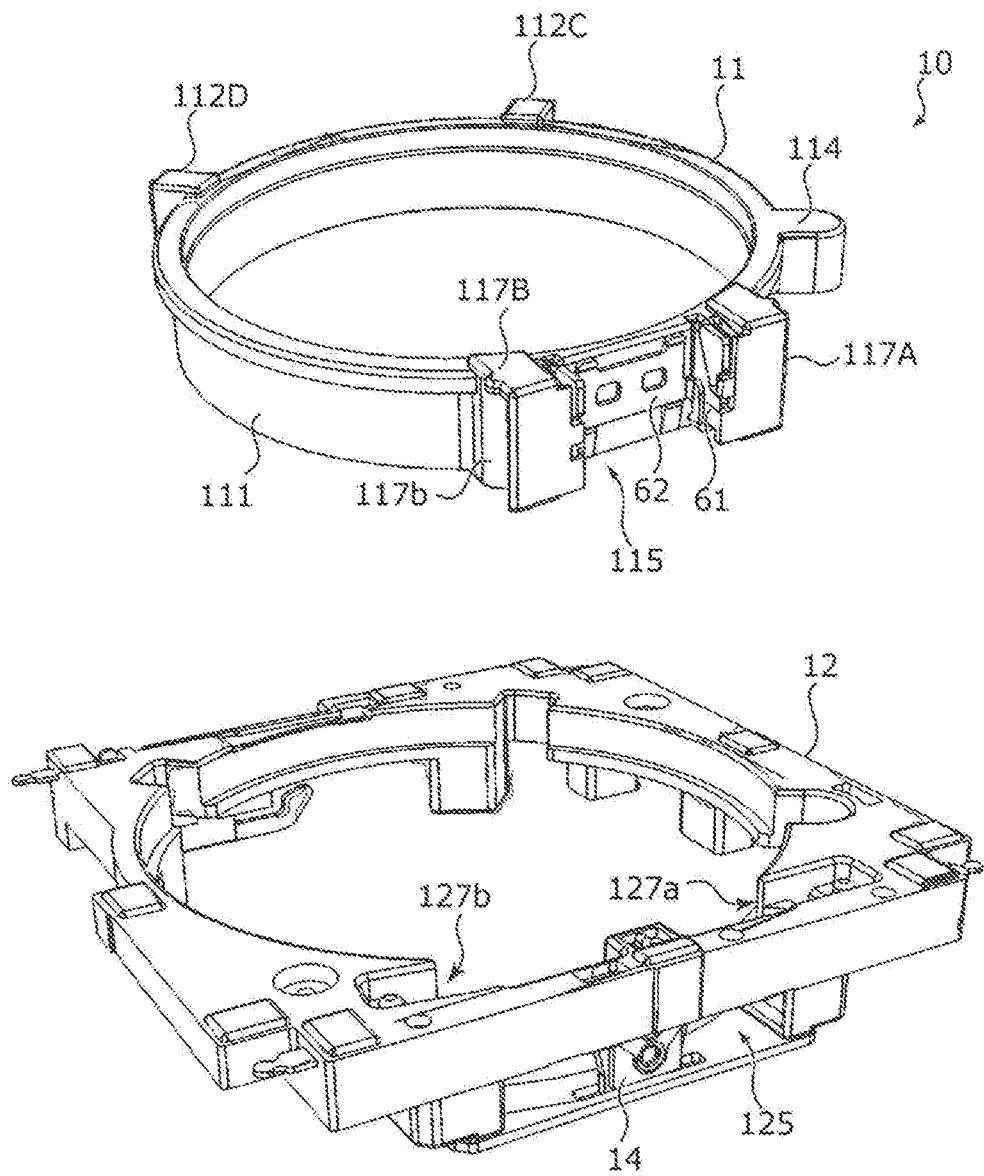
FIG. 26 is an exploded perspective view of the OIS movable part according to Modification 2.
Figure 27A:
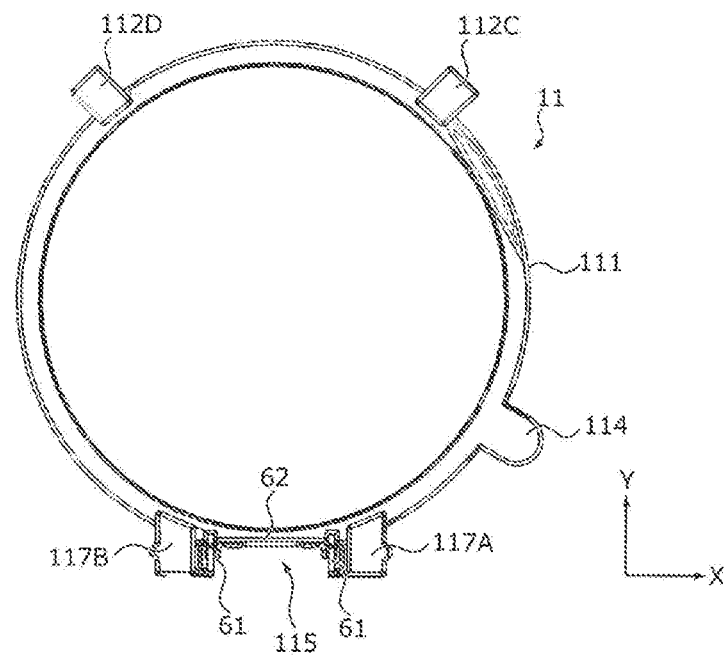
FIGS. 27A and 27B are plan views of an AF movable part and a first stage according to Modification 2.
Figure 27B:
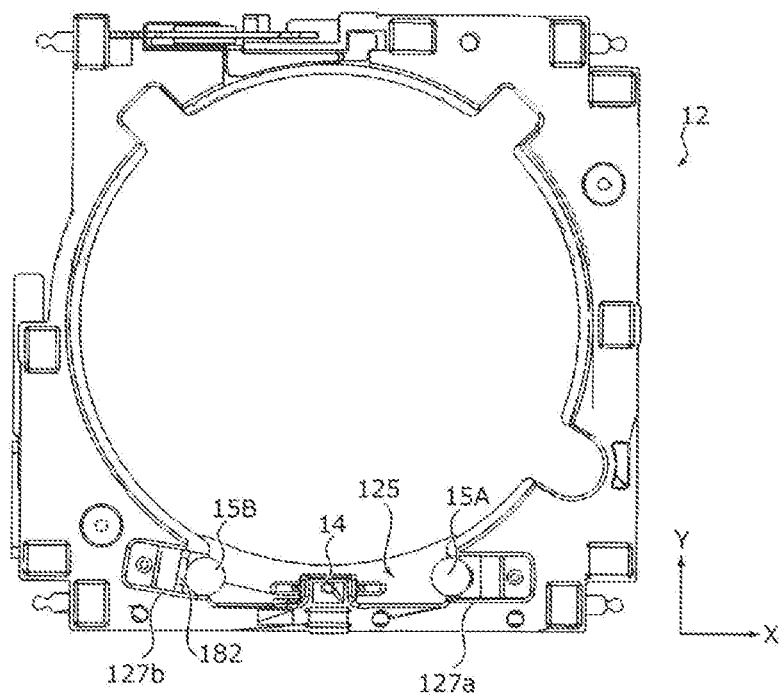
Figure 28A:
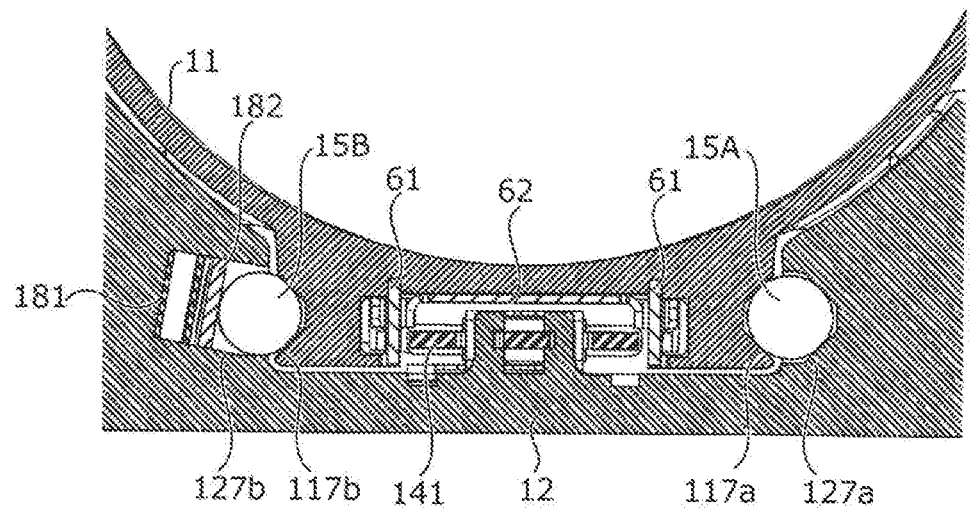
FIGS. 28A and 28B are enlarged views of a cross section and a longitudinal section of the OIS movable part according to Modification 2.
Figure 28B:
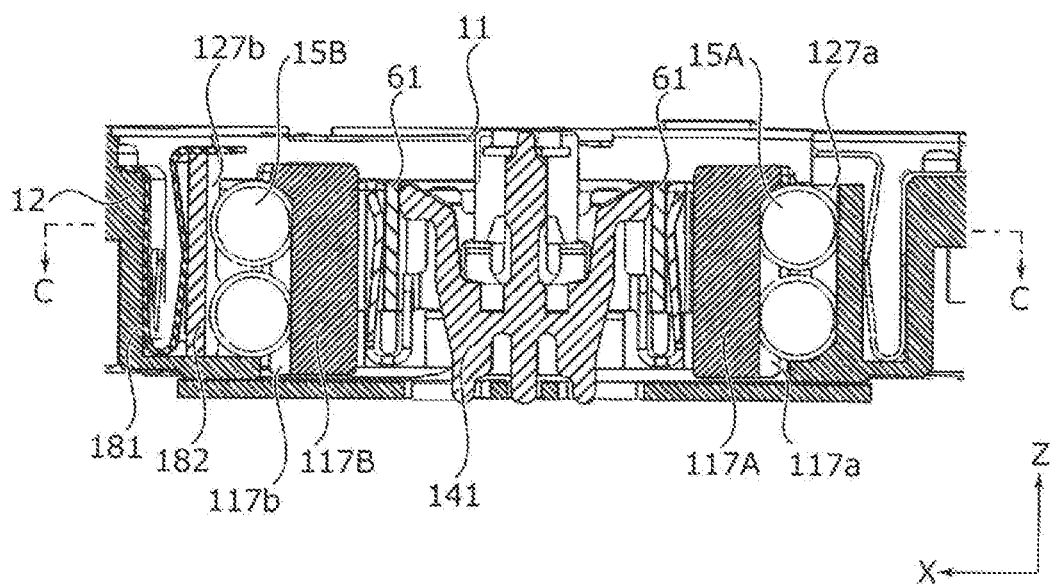
Figure 29A:
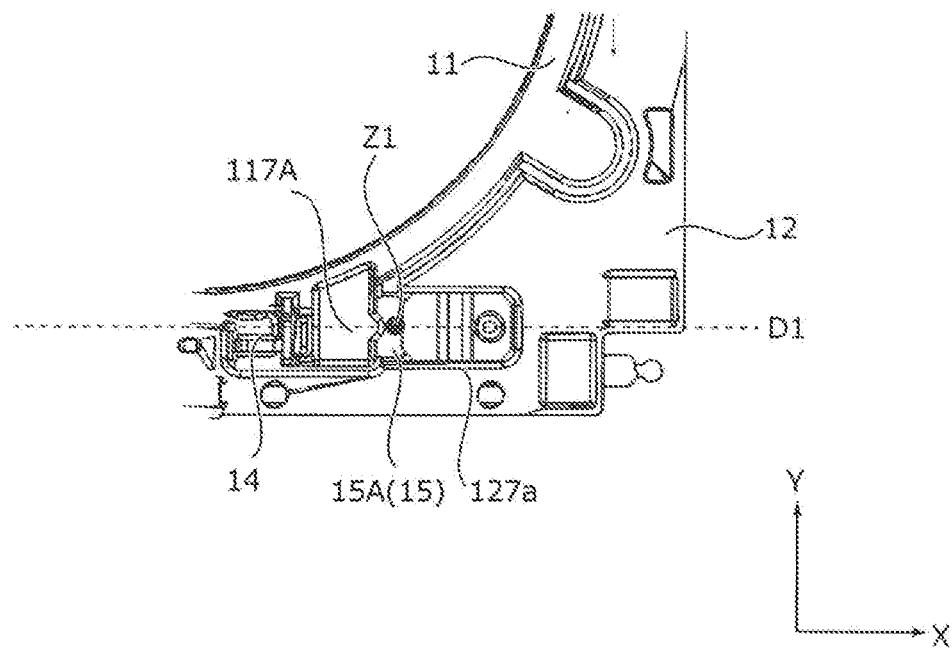
FIGS. 29A and 29B are views illustrating a biasing mode of biasing the AF movable part with respect to the first stage.
Figure 29B:
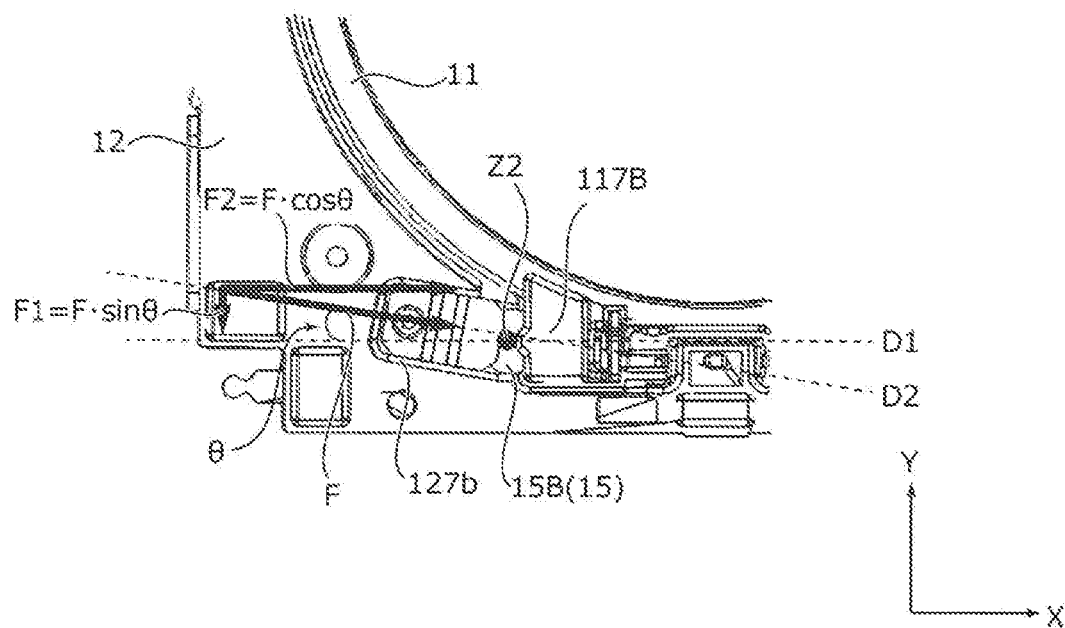

FIG. 25 is a plan view of OIS movable part 10 according to Modification 2 as seen from the light reception side in the optical-axis direction. FIG. 26 is an exploded perspective view of OIS movable part 10 according to Modification 2. In FIGS. 25 and 26, illustration of second stage 13 is omitted. FIGS. 27A and 27B are plan views of AF movable part 11 and first stage 12 according to Modification 2. FIGS. 28A and 28B are enlarged views of a cross section and a longitudinal section of OIS movable part 10 according to Modification 2. FIG. 28A is a sectional view taken along line C-C and seen in the direction indicated by the arrows in FIG. 28B, and FIG. 28B is a sectional view taken along line B-B and seen in the direction indicated by the arrows in FIG. 25. FIGS. 29A and 29B are enlarged views illustrating the placement of AF supporting part 15.

The same or corresponding constituent elements as those of optical-element driving device 1 illustrated with respect to the embodiment and Modification 1 are denoted by the same reference numerals, and description thereof will be omitted.

As illustrated in FIG. 25 and the like, in Modification 2, AF movable part 11 includes, on the circumferential surface portion of lens housing 111, protruding portions 112C, 112D, 117A, and 117B protruding toward first stage 12. Protruding portions 112C and 112D are the same as that of the embodiment. Protruding portions 117A and 117B are disposed to face each other in the X-direction, and form one space extending in the tangential direction (here, the X-direction) of lens housing 111.

Protruding portions 117A and 117B, together with first stage 12, hold Z-direction reference balls 15A and 15B being AF supporting part 15. First Z-direction reference ball holding portion 117a for accommodating first Z-direction reference balls 15A is formed in protruding portion 117A of protruding portions 117A and 117B. Second Z-direction reference ball holding portion 117b for accommodating second Z-direction reference balls 15B is formed in protruding portion 117B of protruding portions 117A and 117B. First Z-direction reference ball holding portion 117a and second Z-direction reference ball holding portion 117b are formed substantially in a V-shape (tapered shape) in a section such that the groove widths decrease toward the groove bottoms.

In addition, in AF movable part 11, a space formed by protruding portions 117A and 117B serves as driving-unit housing 115 in which AF driving unit 14 is disposed. The holding structure for holding AF driving unit 14 is, for example, the same as that of Modification 1. That is, plates 61 being a passive element of AF driving unit 14 are interposed between AF resonant portion 141 and biasing member 62. AF driving unit 14 is sandwiched between two plates 61, and the power from AF resonant portion 141 is transmitted to AF movable part 11 via plates 61.

In Modification 2, protruding portions 117A and 117B have both functions of a function of protruding portions 112A and 112B in the embodiment for housing Z-direction reference balls 15A and 15B and a function of plate housings 116 in Modification 1 for housing plates 61.

In first stage 12, AF motor fixing portion 125 is formed by cutting out portions corresponding to protruding portions 117A and 117B of AF movable part 11 and corresponding to the space sandwiched between the protruding portions. Further, first Z-direction reference ball holding portion 127a and second Z-direction reference ball holding portion 127b are formed continuously to both sides of AF motor fixing portion 125.

First Z-direction reference ball holding portion 127a is formed along tangential direction D1 of lens housing 111 (see FIG. 29A). Further, the inner surface of first Z-direction reference ball holding portion 127a (the surface on the AF motor fixing portion 125 side) is formed to have a substantially V-shaped (tapered) sectional shape such that the groove width decreases toward the groove bottom.

Second Z-direction reference ball holding portion 127b is formed to be inclined with respect to tangential direction D1 of lens housing 111 (see FIG. 29B). Further, the inner surface of second Z-direction reference ball holding portion 127b (the surface on the AF motor fixing portion 125 side) is formed to have a substantially U-shaped section. Biasing part 18 (leaf spring 181 and spacer 182) for biasing AF movable part 11 via second Z-direction reference balls 15B is disposed together with second Z-direction reference balls 15B in second Z-direction reference ball holding portion 127b. Note that, FIG. 27B illustrates a state in which leaf spring 181 is removed.

Second Z-direction reference balls 15B are biased obliquely with respect to tangential direction D1 of lens housing 111 (see FIG. 29B). Thus, AF movable part 11 is pressed via second Z-direction reference balls 15B in the X-direction and the Y-direction, which are two directions orthogonal to each other, and is held in a stable attitude in the optical-axis-orthogonal plane. Letting the angle between tangential direction D1 and biasing direction D2 be θ and the pressure by leaf spring 181 be F, the pressing force in the Y-direction is F1=F·sin θ, and the pressing force in the X-direction is F2=F·cos θ.

Here, angle θ formed by tangential direction D1 and biasing direction D2 is, for example, 0° to 45° (excluding 0°). Biasing direction D2 is set in balance with pressure F, for example, such that the rotation of AF movable part 11 about the optical axis is restricted. For example, when angle θ formed between biasing direction D2 and tangential direction D1 is increased, the pressing force in the Y-direction is increased. Accordingly, pressure F by leaf spring 181 can be reduced. However, increased angle θ causes disadvantages in terms of space, such as a need to increase the protrusion length of protruding portions 117A and 117B. On the contrary, it is advantageous in terms of space when angle θ formed between biasing direction D2 and tangential direction D1 is small. However, the pressing force in the Y-direction is reduced, and it is thus necessary to increase the pressure by leaf spring 181.

First Z-direction reference balls 15A are held between first Z-direction reference ball holding portions 117a and 127a of AF movable part 11 and first stage 12 in a rollable manner. Further, second Z-direction reference balls 15B are held between spacer 182 disposed in second Z-direction reference ball holding portion 127*b* of first stage 12 and second Z-direction reference ball holding portion 117*b* of AF movable part 11 in a rollable manner. AF movable part 11 is supported and held in a stable attitude by first stage 12 while biased via first Z-direction reference balls 15A and second Z-direction reference balls 15B. In Modification 2, second Z-direction reference balls 15B also function as pressurization balls.

First Z-direction reference balls 15A are sandwiched between AF movable part 11 and first stage 12, and are restricted from moving in the direction perpendicular to the optical axis (the rotation of AF movable part 11). As a result, AF movable part 11 can be moved in a stable manner in the optical-axis direction.

Meanwhile, second Z-direction reference balls 15B are sandwiched between AF movable part 11 and first stage 12 via leaf spring 181 and spacer 182, and are allowed to move in the direction perpendicular to the optical axis. With this configuration, it is possible to absorb the dimensional tolerances of AF movable part 11 and first stage 12, and the stability during movement of AF movable part 11 is improved.

Further, first Z-direction reference balls 15A and second Z-direction reference balls 15B are composed of two balls, and the diameters thereof are set to be larger than those in the embodiment and Modification 1. In this case, the rolling resistances of first Z-direction reference balls 15A and second Z-direction reference balls 15B are smaller than those in the embodiment and Modification 1.

As described above, in Modification 2, AF supporting part 15 that supports AF movable part 11 (movable part) with respect to first stage 12 (fixing part) includes first Z-direction reference balls 15A (first reference balls), second Z-direction reference balls 15B (second reference balls), and leaf spring 181 (biasing member) that biases AF movable part 11 to first stage 12 via second Z-direction reference balls 15B. AF movable part 11 includes cylindrical lens housing 111 (circumferential surface portion) and protruding portions 117A and 117B (first protruding portion and second protruding portion) disposed on lens housing 111 to protrude toward first stage 12 and forming one space extending in the X-direction (tangential direction D1 of lens housing 111). AF driving unit 14 (driving unit) is sandwiched between protruding portions 117A and 117B, and first Z-direction reference balls 15A and second Z-direction reference balls 15B are disposed on sides of protruding portions 117A and 117B opposite to sides where AF driving unit 14 is disposed.

AF supporting part 15 (first supporting part) is disposed at two places on opposite sides across AF driving unit 14 in the extending direction of AF driving unit 14 (Z-direction driving part), and biasing part 18 (first biasing part) is disposed on one AF supporting part 15 side.

In the embodiment and Modification 1, AF movable part 11 includes protruding portions 112A and 112B protruding from cylindrical lens housing 111, and protruding portions 112A and 121B are sandwiched respectively between first Z-direction reference balls 15A and first pressurization balls 15C and between second Z-direction reference balls 15B and second pressurization balls 15D. That is, AF movable part 11 is supported at two places with respect to first stage 12.

When AF movable part 11 is moved in the optical-axis direction, a moment is generated in AF movable part 11 in accordance with a distance from a force point (a contact point between AF resonant portion 141 and AF power transmission part 144) where the AF movable part receives the driving force of AF driving unit 14 to a rotational axis (a center of first Z-direction reference balls 15A). Therefore, AF movable part 11 needs to be pressed against first stage 12 by a pressure that can cancel the moment.

In the embodiment and Modification 1, AF movable part 11 is configured to be supported with respect to first stage 12 at two places. It is thus possible to receive an external force while dispersing the external force. However, there is a limit in reducing the moment by reducing the distance from the force point to the rotational axis to reduce the pressure.

As opposed thereto, Modification 2 is configured such that a portion of AF movable part 11 where AF driving unit 14 is disposed is sandwiched between first Z-direction reference balls 15A and second Z-direction reference balls 15B, and the pressure is applied to second Z-direction reference balls 15B, that is, AF movable part 11 is supported at one place with respect to first stage 12.

Thus, as compared with the embodiment and Modification 1, it is easier to reduce the distance between, on one hand, the force point at which the driving force of AF driving unit 14 is applied, and, on the other hand, the rotational axis, and it is possible to reduce the moment to reduce the pressure. Further, second Z-direction reference balls 15B function as pressurization balls, and first and second pressurization balls 15C and 15D in the embodiment are not required. It is thus possible to reduce the rolling resistance. Therefore, the driving efficiency of AF driving unit 14 is improved, and also becomes suitable for an optical-element driving device for a large diameter lens. In addition, in the condition of the same pressure, the tilt resistance is higher.

In Modification 2, biasing direction D2 in which second Z-direction reference balls 15B are biased by leaf spring 181 intersects tangential direction D1. Specifically, angle θ between tangential direction D1 and biasing direction D2 is 0° to 45°. Since the extending direction of AF driving unit 14 is the same as tangential direction D1, it can also be said that biasing part 18 (first biasing part) is disposed such that the biasing direction in plan view intersects the extending direction of AF driving unit 14 and such that the biasing part biases AF driving unit 14.

As a result, AF movable part 11 is pressed via second Z-direction reference balls 15B in the X-direction and the Y-direction, which are two directions orthogonal to each other. Thus, the attitude in the optical-axis-orthogonal plane can be stabilized.

In Modification 2, both first Z-direction reference balls 15A and second Z-direction reference balls 15B include two balls.

As a result, the rolling resistances of first Z-direction reference balls 15A and second Z-direction reference balls 15B can be reduced as compared with the embodiment and Modification 1, and the driving efficiency of AF driving unit 14 can be further improved.

While the invention made by the present inventors has been specifically described based on the preferred embodiment, it is not intended to limit the present invention to the above-mentioned preferred embodiment, but the present invention may be further modified within the scope and spirit of the invention defined by the appended claims.

For example, while smartphone M serving as a camera-equipped mobile terminal has been described in the embodiment as an example of the camera-mounted device including camera module A, the present invention is applicable to a camera-mounted device including a camera module and an image processing part that processes image information obtained by the camera module. The camera-mounted device encompasses an information apparatus and a transporting apparatus. Examples of the information apparatus include a camera-mounted mobile phone, a note-type personal computer, a tablet terminal, a mobile game machine, a web camera, and a camera-mounted in-vehicle device (for example, a rear-view monitor device or a drive recorder device). In addition, examples of the transporting apparatus include an automobile.

Figure 30A:
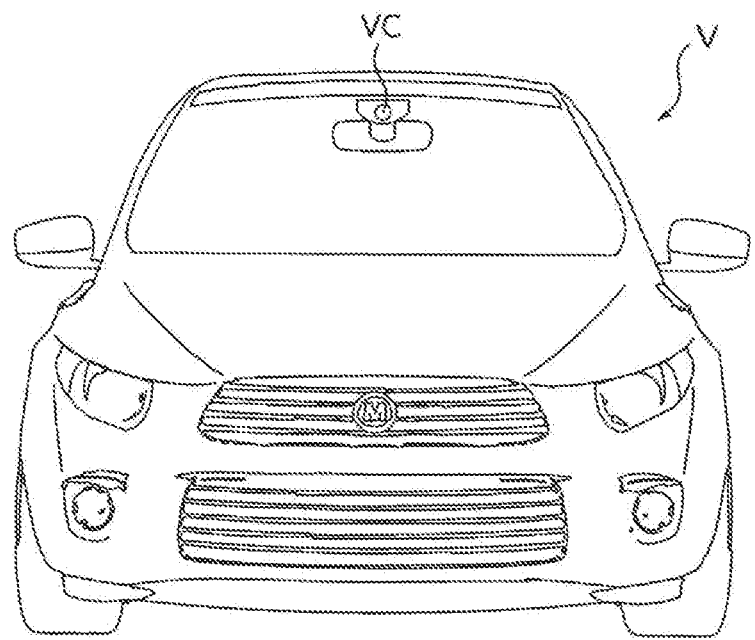
FIGS. 30A and 30B illustrate an automobile as a camera-mounted device in which an in-vehicle camera module is mounted.
Figure 30B:
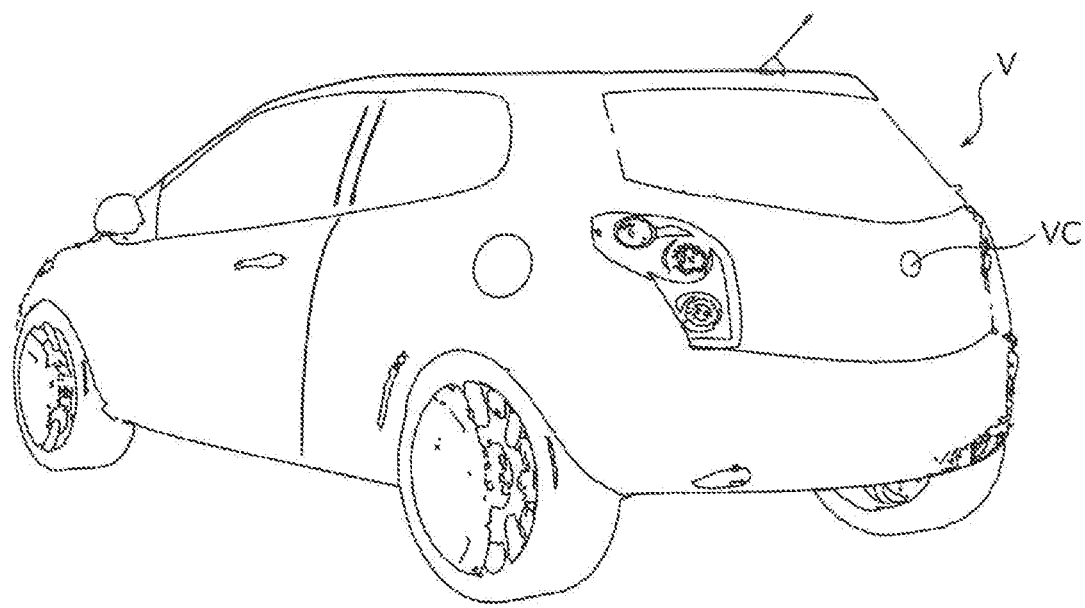

FIGS. 30A and 30B illustrate automobile V serving as the camera-mounted device in which in-vehicle camera module VC (Vehicle Camera) is mounted. FIG. 30A is a front view of automobile V and FIG. 30B is a rear perspective view of automobile V. In automobile V, camera module A described in the embodiment is mounted as in-vehicle camera module VC. As illustrated in FIGS. 30A and 30B, in-vehicle camera module VC may, for example, be attached to the windshield so as to face forward, or to the rear gate so as to face backward. In-vehicle camera module VC is used for rear monitoring, drive recording, collision avoidance control, automatic drive control, and the like.

In the embodiment, AF movable part 11 and first stage 12 are provided respectively with first Z-direction reference ball holding portions 112a and 122a and with second Z-direction reference ball holding portions 112b and 122b. However, either AF movable part 11 or first stage 12 may be provided with the first Z-direction reference ball holding portion and the second Z-direction reference ball holding portion.

Further, in the embodiment, first Z-direction reference balls 15A and second Z-direction reference balls 15B are disposed symmetrically in the circumferential direction with respect to AF driving unit 14, but may be disposed asymmetrically. In this case, in order to stabilize the moving operation of AF movable part 11, it is preferable that first Z-direction reference balls 15A be on the AF driving unit 14 side.

Further, in the embodiment, AF driving unit 14 is disposed along the X-direction, but the aspect of placement of AF driving unit 14 is not limited to this. For example, the AF driving unit may be disposed along the Y-direction, or may be disposed to be inclined with respect to the X-direction and the Y-direction.

In addition, the present invention can be applied not only to autofocus but also to a case where a movable part is moved in the optical-axis direction, such as zoom.

Further, the support structure of the AF unit is not limited to the case where the driving source is composed of an ultrasonic motor as in AF driving unit 14, but can also be applied to an optical-element driving device including a driving source (e.g., voice coil motor (VCM)) other than an ultrasonic motor.

In addition, although the embodiment has been described in relation to optical-element driving device 1 that drives lens part 2 as an optical element, the optical element to be driven may be an optical element other than a lens, such as a mirror or a prism.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

The disclosures of U.S. Provisional Patent Application No. 63/002,305 filed on Mar. 30, 2020, U.S. Provisional Patent Application No. 63/051,917 filed on Jul. 15, 2020, and U.S. Provisional Patent Application No. 63/078,357 filed on Sep. 15, 2020, including the specification, drawings and abstract is incorporated herein by reference in its entirety.

REFERENCE SIGNS LIST

1 Optical-element driving device
10 OIS movable part (second movable part)
11, 51 AF movable part (first movable part)
12 First stage (first fixing part)
13 Second stage
14 AF driving unit (Z-direction driving part)
141 AF resonant portion (active element)
142 AF piezoelectric element
143 AF electrode
144 AF power transmission part (passive element)
15 AF supporting part (first supporting part)
15A First Z-direction reference ball (first reference ball)
15B Second Z-direction reference ball (second reference ball)
18 Biasing part (first biasing part)
181 Leaf spring (elastic member)
182 Spacer
20 OIS fixing part (second fixing part)
21 Base
30 OIS driving unit (XY-direction driving part)
31 OIS resonant portion (active element)
32 OIS piezoelectric element (active element)
33 OIS electrode
34 OIS power transmission part (passive element)
40 OIS supporting part (second supporting part)
50 OIS biasing member
61 Plate (passive element)
62 Biasing member
112a, 122a First Z-direction reference ball holding portion (first reference ball holding portion)
112b, 122b Second Z-direction reference ball holding portion (second reference ball holding portion)
A Camera module
M Smartphone (camera-mounted device)

What is claimed is:

1. An optical-element driving device, comprising:
a first fixing part in which a pair of holding grooves are formed with an interval therebetween;
a first movable part disposed radially inside of the first fixing part;
a first supporting part including a pair of ball rows interposed between the first fixing part and the first movable part, and supporting the first movable part with respect to the first fixing part, the pair of ball rows being arranged in parallel with an optical axis and at the interval from each other on an outside of the first movable part and each held by a corresponding holding groove of the pair of holding grooves;
a Z-direction driving part including an ultrasonic motor for converting a vibration into a linear motion, the Z-direction driving part being configured to move the first movable part in an optical-axis direction by the linear motion; and
a first biasing part including an elastic member and a spacer that are disposed with one ball row of the pair of ball rows in the corresponding holding groove holding the one ball row, the first biasing part being configured to bias the one ball row to the first movable part by the elastic member via the spacer, the elastic member being a leaf spring, the spacer being a plate-shaped member sandwiched by the leaf spring and the one ball row, wherein the first biasing part is configured to bias the one ball row in an oblique direction with respect to a formation direction in which the corresponding holding groove holding an other one of the pair of ball rows is formed, the oblique direction being one constant direction.

2. The optical-element driving device according to claim 1, wherein:

the Z-direction driving part extends linearly in a plane orthogonal to the optical-axis direction, and the first supporting part and the Z-direction driving part as seen in plan view in the optical-axis direction are disposed on a same-half side of the optical-element driving device.

3. A camera module, comprising:

an optical-element driving device according to claim 1;

a lens part to be attached to the first movable part; and an image capturing part configured to capture a subject image imaged by the lens part.

4. A camera-mounted device that is an information apparatus or a transporting apparatus, the camera-mounted device comprising:

a camera module according to claim 3; and an image processing part configured to process image information obtained by the camera module.

5. The optical-element driving device according to claim 1, wherein the holding groove holding the one ball row is deeper than the holding groove holding the other one of the pair of ball rows.

6. An optical-element driving device, comprising:

a first fixing part;

a first movable part disposed radially inside of the first fixing part;

a first supporting part interposed between the first fixing part and the first movable part, and supporting the first movable part with respect to the first fixing part;

a Z-direction driving part including an ultrasonic motor for converting a vibration into a linear motion, the Z-direction driving part being configured to move the first movable part in an optical-axis direction by the linear motion;

a holding groove formed in the first fixing part and configured to hold the first supporting part; and a first biasing part including an elastic member and a spacer that are disposed with the first supporting part in the holding groove, the first biasing part being configured to bias the first supporting part toward the first movable part by the elastic member via the spacer, wherein:

the first supporting part includes a pair of ball rows arranged at an interval from each other on an outside of the first movable part, the pair of ball rows being held respectively by different ones of a plurality of the holding grooves, each of the pair of ball rows being parallel to an optical axis, the first biasing part is configured to bias one of the pair of ball rows obliquely with respect to a formation direction in which one of the holding grooves for holding an other one of the pair of ball rows is formed, and the optical-element driving device further comprises:

a second fixing part;

a second movable part including the first fixing part, the first movable part, and the first supporting part, the second movable part being disposed to be spaced apart in the optical-axis direction from the second fixing part; and an XY-direction driving part including an ultrasonic motor for converting a vibration into a linear motion, the XY-direction driving part being configured to move the second movable part in a direction orthogonal to the optical-axis direction by the linear motion, wherein;

the Z-direction driving part is disposed in a first linear region in a plane orthogonal to the optical-axis direction, and the XY-direction driving part is disposed in a second linear region and a third linear region, the second linear region being orthogonal to the first linear region, the third linear region being parallel to the first linear region.

7. The optical-element driving device according to claim 6, further comprising:

a sensor board on which a detection sensor for detecting a position of the first movable part in the optical-axis direction and a position of the second movable part in the direction orthogonal to the optical-axis direction is mounted, wherein the sensor board is disposed in a region other than the first to the third linear regions.

8. A camera module, comprising:

an optical-element driving device according to claim 6;

a lens part to be attached to the first movable part; and an image capturing part configured to capture a subject image imaged by the lens part.

9. A camera-mounted device that is an information apparatus or a transporting apparatus, the camera-mounted device comprising:

a camera module according to claim 8; and an image processing part configured to process image information obtained by the camera module.

10. An optical-element driving device, comprising:

a first fixing part in which a pair of holding grooves are formed with an interval therebetween;

a first movable part disposed radially inside of the first fixing part;

a first supporting part including a pair of supporting members interposed between the first fixing part and the first movable part, and supporting the first movable part with respect to the first fixing part, each of the pair of supporting members being held by a corresponding holding groove of the pair of holding grooves;

a Z-direction driving part including an ultrasonic motor for converting a vibration into a linear motion, the Z-direction driving part being configured to move the first movable part in an optical-axis direction by the linear motion; and a first biasing part including an elastic member and a spacer that are disposed with one supporting member of the pair of supporting members in the corresponding holding groove holding the one supporting member, the first biasing part being configured to bias the one supporting member to the first movable part by the elastic member via the spacer, the elastic member being a leaf spring, the spacer being a plate-shaped member sandwiched by the leaf spring and the one supporting member, wherein:

the Z-direction driving part extends linearly in a plane orthogonal to the optical-axis direction, the first supporting part and the Z-direction driving part as seen in plan view in the optical-axis direction are disposed on a same-half side of the optical-element driving device, and the first supporting part is disposed at two places on opposite sides across the Z-direction driving part in an extending direction of the Z-direction driving part.

11. The optical-element driving device according to claim 10, wherein:

the pair of supporting members is a pair of ball rows arranged at the interval from each other on an outside of the first movable part, the pair of ball rows being parallel to an optical axis, and the first biasing part biases the one ball row obliquely with respect to a formation direction in which the corresponding holding groove holding an other one of the pair of ball rows is formed.

12. The optical-element driving device according to claim 10, wherein:

the formation direction is an X-direction, and the first movable part is pushed via the one ball row in the X-direction and a Y-direction that are two directions orthogonal to each other.

13. A camera module, comprising:

an optical-element driving device according to claim 10;

a lens part to be attached to the first movable part; and an image capturing part configured to capture a subject image imaged by the lens part.

14. A camera-mounted device that is an information apparatus or a transporting apparatus, the camera-mounted device comprising:

a camera module according to claim 13; and an image processing part configured to process image information obtained by the camera module.

15. The optical-element driving device according to claim 10, wherein the holding groove holding the one supporting member is deeper than the holding groove holding the other one of the pair of supporting members.

16. An optical-element driving device, comprising:

a first fixing part;

a first movable part disposed radially inside of the first fixing part;

a first supporting part interposed between the first fixing part and the first movable part, and supporting the first movable part with respect to the first fixing part;

a Z-direction driving part including an ultrasonic motor for converting a vibration into a linear motion, the Z-direction driving part being configured to move the first movable part in an optical-axis direction by the linear motion;

a holding groove formed in the first fixing part and configured to hold the first supporting part; and a first biasing part including an elastic member and a spacer that are disposed with the first supporting part in the holding groove, the first biasing part being configured to bias the first supporting part toward the first movable part by the elastic member via the spacer, wherein:

the Z-direction driving part extends linearly in a plane orthogonal to the optical-axis direction, the first supporting part and the Z-direction driving part as seen in plan view in the optical-axis direction are disposed on a same-half side of the optical-element driving device, the first supporting part is disposed at two places on opposite sides across the Z-direction driving part in an extending direction of the Z-direction driving part, the first biasing part is disposed on one first supporting part side, and the optical-element driving device further comprises:

a second fixing part;

a second movable part including the first fixing part, the first movable part, and the first supporting part, the second movable part being disposed to be spaced apart in the optical-axis direction from the second fixing part; and an XY-direction driving part including an ultrasonic motor for converting a vibration into a linear motion, the XY-direction driving part being configured to move the second movable part in a direction orthogonal to the optical-axis direction by the linear motion, wherein:

the Z-direction driving part is disposed in a first linear region in a plane orthogonal to the optical-axis direction, and the XY-direction driving part is disposed in a second linear region and a third linear region, the second linear region being orthogonal to the first linear region, the third linear region being parallel to the first linear region.

17. The optical-element driving device according to claim 16, further comprising:

a sensor board on which a detection sensor for detecting a position of the first movable part in the optical-axis direction and a position of the second movable part in the direction orthogonal to the optical-axis direction is mounted, wherein the sensor board is disposed in a region other than the first to the third linear regions.

18. A camera module, comprising:

an optical-element driving device according to claim 16;

a lens part to be attached to the first movable part; and an image capturing part configured to capture a subject image imaged by the lens part.

19. A camera-mounted device that is an information apparatus or a transporting apparatus, the camera-mounted device comprising:

a camera module according to claim 18; and an image processing part configured to process image information obtained by the camera module.

* * * * *